(12) United States Patent
Suri et al.

(10) Patent No.: US 7,856,130 B2
(45) Date of Patent: Dec. 21, 2010

(54) OBJECT RECOGNITION SYSTEM FOR MEDICAL IMAGING

(75) Inventors: Jasjit S. Suri, Roseville, CA (US); Lu Li, Grass Valley, CA (US)

(73) Assignee: Eigen, Inc., Grass Valley, CA (US)

( * ) Notice: Subject to any disclaimer, the term of this patent is extended or adjusted under 35 U.S.C. 154(b) by 809 days.

(21) Appl. No.: 11/833,404

(22) Filed: Aug. 3, 2007

(65) Prior Publication Data
US 2008/0240526 A1   Oct. 2, 2008

Related U.S. Application Data

(60) Provisional application No. 60/908,439, filed on Mar. 28, 2007.

(51) Int. Cl.
*G06K 9/00* (2006.01)
(52) U.S. Cl. .................. 382/128; 382/130; 382/131; 382/132; 382/199; 600/443
(58) Field of Classification Search .......... 382/128, 382/130, 131, 132, 199; 600/443
See application file for complete search history.

(56) References Cited

U.S. PATENT DOCUMENTS

| | | | |
|---|---|---|---|
| 5,170,790 A | 12/1992 | Lacoste et al. | |
| 5,282,472 A | 2/1994 | Companion et al. | |
| 5,320,101 A | 6/1994 | Faupel et al. | |
| 5,383,454 A | 1/1995 | Bucholz | |
| 5,398,690 A | 3/1995 | Batten et al. | |
| 5,454,371 A | 10/1995 | Fenster et al. | |
| 5,531,520 A | 7/1996 | Grimson et al. | |
| 5,562,095 A | 10/1996 | Downey et al. | |
| 5,611,000 A | 3/1997 | Szeliski et al. | |
| 5,795,296 A * | 8/1998 | Pathak et al. | 600/443 |
| 5,810,007 A | 9/1998 | Holupka et al. | |
| 5,842,473 A | 12/1998 | Fenster et al. | |
| 6,092,059 A | 7/2000 | Straforini et al. | |
| 6,171,249 B1 | 1/2001 | Chin et al. | |
| 6,238,342 B1 | 5/2001 | Feleppa et al. | |
| 6,251,072 B1 | 6/2001 | Ladak et al. | |
| 6,261,234 B1 | 7/2001 | Lin | |
| 6,298,148 B1 | 10/2001 | Cline et al. | |
| 6,334,847 B1 | 1/2002 | Fenster et al. | |
| 6,342,891 B1 | 1/2002 | Fenster et al. | |
| 6,351,660 B1 | 2/2002 | Burke et al. | |
| 6,360,027 B1 | 3/2002 | Hossack et al. | |

(Continued)

FOREIGN PATENT DOCUMENTS

WO    0014668    3/2000

(Continued)

*Primary Examiner*—Tom Y Lu
(74) *Attorney, Agent, or Firm*—Marsh Fischmann & Breyfogle LLP

(57) ABSTRACT

An improved system and method (i.e. utility) for segmentation of medical images is provided. The utility fits an estimated boundary on a structure of interest in an automated selection and fitting process. The estimated boundary may be a model boundary that is generated actual boundaries of like structures. In one arrangement, the boundaries may be selected based on the age and/or ethnicity of a patient. In further arrangements, narrow band processing is performed to estimate the actual boundary of the structure of interest.

25 Claims, 23 Drawing Sheets

U.S. PATENT DOCUMENTS

| | | |
|---|---|---|
| 6,385,332 B1 | 5/2002 | Zahalka et al. |
| 6,423,009 B1 | 7/2002 | Downey et al. |
| 6,425,865 B1 | 7/2002 | Salcudean et al. |
| 6,447,477 B2 | 9/2002 | Burney et al. |
| 6,451,027 B1 | 9/2002 | Cooper et al. |
| 6,500,123 B1 | 12/2002 | Holloway et al. |
| 6,561,980 B1 | 5/2003 | Gheng et al. |
| 6,567,687 B2 | 5/2003 | Front et al. |
| 6,610,013 B1 | 8/2003 | Fenster et al. |
| 6,611,615 B1 | 8/2003 | Christensen |
| 6,674,916 B1 | 1/2004 | Deman et al. |
| 6,675,032 B2 | 1/2004 | Chen et al. |
| 6,675,211 B1 | 1/2004 | Mamaghani et al. |
| 6,687,392 B1 * | 2/2004 | Touzawa et al. ............ 382/128 |
| 6,689,065 B2 | 2/2004 | Aksnes et al. |
| 6,778,690 B1 | 8/2004 | Ladak et al. |
| 6,824,516 B2 | 11/2004 | Batten et al. |
| 6,842,638 B1 | 1/2005 | Suri et al. |
| 6,852,081 B2 | 2/2005 | Sumanaweera et al. |
| 6,909,792 B1 | 6/2005 | Carrott et al. |
| 6,952,211 B1 | 10/2005 | Cote et al. |
| 6,985,612 B2 | 1/2006 | Hahn |
| 7,004,904 B2 | 2/2006 | Chalana et al. |
| 7,008,373 B2 | 3/2006 | Stoianovici et al. |
| 7,039,216 B2 | 5/2006 | Shum et al. |
| 7,039,239 B2 | 5/2006 | Loui et al. |
| 7,043,063 B1 | 5/2006 | Noble et al. |
| 7,095,890 B2 | 8/2006 | Paragios et al. |
| 7,119,810 B2 | 10/2006 | Sumanaweera et al. |
| 7,139,601 B2 | 11/2006 | Bucholz et al. |
| 7,148,895 B2 | 12/2006 | Konishi et al. |
| 7,155,316 B2 | 12/2006 | Sutherland et al. |
| 7,162,065 B2 | 1/2007 | Ladak et al. |
| 7,167,760 B2 | 1/2007 | Dawant et al. |
| 7,225,012 B1 | 5/2007 | Susil et al. |
| 7,274,811 B2 | 9/2007 | Sirohey et al. |
| 7,302,092 B1 | 11/2007 | Fenster et al. |
| 7,403,646 B2 | 7/2008 | Sato |
| 2003/0000535 A1 | 1/2003 | Galloway, Jr. et al. |
| 2003/0135115 A1 | 7/2003 | Burdette et al. |
| 2004/0210133 A1 | 10/2004 | Nir |
| 2004/0218797 A1 | 11/2004 | Ladak et al. |
| 2005/0159676 A1 | 7/2005 | Taylor et al. |
| 2005/0190189 A1 | 9/2005 | Chefd'hotel et al. |
| 2005/0197977 A1 | 9/2005 | Buck et al. |
| 2005/0240104 A1 | 10/2005 | Shim et al. |
| 2005/0243087 A1 | 11/2005 | Aharon |
| 2005/0249398 A1 | 11/2005 | Khamene et al. |
| 2006/0002601 A1 | 1/2006 | Fu et al. |
| 2006/0002630 A1 | 1/2006 | Fu et al. |
| 2006/0013482 A1 | 1/2006 | Dawant et al. |
| 2006/0036162 A1 | 2/2006 | Shahidi et al. |
| 2006/0079771 A1 | 4/2006 | Nir |
| 2006/0197837 A1 | 9/2006 | Flath et al. |
| 2006/0227131 A1 | 10/2006 | Schiwietz et al. |
| 2006/0258933 A1 | 11/2006 | Ellis et al. |
| 2007/0014446 A1 | 1/2007 | Sumanaweera et al. |
| 2007/0040830 A1 | 2/2007 | Papageorgiou |
| 2007/0116339 A1 | 5/2007 | Shen |
| 2007/0116381 A1 | 5/2007 | Khamene |
| 2007/0189603 A1 | 8/2007 | Kasperkiewicz et al. |
| 2007/0201611 A1 | 8/2007 | Pratx et al. |
| 2007/0270687 A1 | 11/2007 | Gardi et al. |
| 2008/0002870 A1 | 1/2008 | Farag et al. |
| 2008/0123910 A1 | 5/2008 | Zhu |
| 2008/0123927 A1 | 5/2008 | Miga et al. |
| 2008/0170770 A1 | 7/2008 | Suri et al. |
| 2008/0247616 A1 | 10/2008 | Pescatore et al. |
| 2009/0093715 A1 | 4/2009 | Downey et al. |

FOREIGN PATENT DOCUMENTS

| | | |
|---|---|---|
| WO | 2006089426 A1 | 8/2006 |
| WO | 2007045810 A2 | 4/2007 |
| WO | 2008062346 A1 | 5/2008 |
| WO | 2008124138 A1 | 10/2008 |

* cited by examiner

2D Image Storage

3D Volume Image

OBJECT RECOGNITION SYSTEM FOR MEDICAL IMAGING

CROSS REFERENCE TO RELATED APPLICATION

This application claims priority under 35 U.S.C, §119 to U.S. Provisional Application No. 60/908,439 entitled, "AN IMPROVED METHOD OF OBJECT RECOGNITION SYSTEM," and having a filing date of Mar. 28, 2007, the entire contents of which are incorporated herein by reference.

FIELD

The present disclosure pertains to the field of medical imaging, and more particular to the segmentation of medical images to allow for accurate calculation of the volumes of structures of interest within the medical images.

BACKGROUND

Medical imaging, including X-ray, magnetic resonance (MR), computed tomography (CT), ultrasound, and various combinations of these techniques are utilized to provide images of internal patient structure for diagnostic purposes as well as for interventional procedures. One application of medical imaging (e.g., 3D imaging) is the measurement of volume and/or assessment of shape of internal structures of interest. These measurements typically require segmentation of image data, to separate structures of interest from the background, such that accurate calculations may be made.

One area where measurement of shape and volume is utilised is in the detection of prostate cancer. As will be appreciated, prostate cancer is one of the most common types of cancer among American men. Typically for a physician to diagnose prostate cancer, a biopsy of the prostate is performed. Biopsies are typically performed on patients that have either a suspect digital rectal exam (DRE) or abnormal PSA levels. PSA or 'prostate-specific antigen' is a protein produced by the cells of the prostate gland. A PSA test measures the level of PSA in the blood. In this regard, a doctor takes a blood sample, and the amount of PSA is measured in a laboratory.

Volume assessment of the prostate is an important and integral part of the decision to perform a biopsy. That is, the decision to perform biopsy in patients with abnormal PSA levels can be bolstered by PSA density (PSAD), which is defined as the PSA level divided by the prostate volume. In this regard, an expected PSA value may be based at least in part on the volume of a given prostate volume. The volume of the prostate gland can also be used to determine treatment options. Accordingly, it is important to identify the boundaries of the prostate from a medical image such that an accurate volume determination of the prostate can be made.

In addition, biopsy of the prostate requires guidance to a desired location. Such guidance may be provided by transrectal ultrasound imaging (TRUS). In such an application, a 3D image of the prostate may be generated to allow guidance of a biopsy needle to a prostate location of interest. As with volume determination, it is important that the boundaries of the prostate are identified from a medical image in order to allow for accurate biopsy guidance.

Unfortunately, boundary identification (e.g., segmentation) inn medical images is sometimes difficult. Even manual segmentation of medical images, such as ultrasound images, is difficult given the low signal to noise ratio and the presence of imaging artifacts.

SUMMARY OF THE INVENTION

Segmentation of the ultrasound prostate images is a very challenging task due to the relatively poor image qualities. In this regard, segmentation has often required a technician to at least identify an initial boundary of the prostate such that one or more segmentation techniques may be implemented to acquire the actual boundary of the prostate. Generally, such a process of manual boundary identification and subsequent processing has made real time imaging (e.g., generating a segmented image while a TRUS remains positioned) of the prostate impractical. Rather images have been segmented after an imaging procedure to identify structures of interest. Accordingly, subsequent biopsy would require repositioning of a TRUS and alignment of the previous image with a current position of the prostate.

Provided herein are systems and methods (i.e., utilities) that allow for automated segmentation of medical images, including, without limitation, ultrasound prostate images. In this regard, the utilities may be implemented in processing systems that are integrated into medical imaging devices and/or that are interconnected to the medical imaging devices and operative to receive data therefrom. The ability to identify and segment structures within medical images in the automated process allows for such segmentation to be done substantially in real time. In this regard, such segmentation may be done while a patient remains in view of the imaging device. Accordingly, this may allow for guidance to the structure of interest without repositioning the patient.

According to a first aspect, an automated method for use in obtaining a boundary of a structure within a medical image is provided. The method includes obtaining a two-dimensional image including a structure of interest. A center point is identified within the structure of interest in an automated process. Once such a center point is identified, a plurality of radial lines may be extended from the center point. Energy values along the radial lines may be identified in order to identify a boundary of the structure of interest. That is, energy along the radial lines may change within the image based on differences between the structure of interest and the surrounding tissue. Accordingly, by identifying such differences in energy values, edge points associated with the structure may be identified in each radial line. Likewise, such edge points may be connected with a curve to define at least a first boundary.

It will be appreciated that, due to irregularities, artifacts and/or speckling within the medical image, the energy values along each radial line may fluctuate, which may result m identification of one or more false edge points. Accordingly, a related aspect involves eliminating false edge points from a plurality of potential edge points. In one arrangement, a prior shape model is utilized for such edge point elimination. In one arrangement, calculating the energy value along each radial line includes calculating a least-squares value and a gradient value. These values may be added together. Further, smoothing may be done on the resulting values along the length of the radial lines. In such an arrangement, multiple maxima values rosy be identified along the length of the radial lines. Initially, the largest maxima value in each radial line may be initially selected as a likely candidate position for the edge point of the structure of interest. An ellipse may be fit to these points in order to allow for aligning a predetermined shape model with these points. Once the ellipse is fit to the initial points, the shape model may be aligned with the initial points. At this time, the shape model may be expanded and contracted in order to define a narrow band region.

Once a narrow band region is determined, maxima points on each radial line outside of the narrow band may be disregarded/eliminated. Accordingly, the largest remaining maxima value in each radial line within the narrow band may then be selected and plotted. Again, an ellipse may be fit to these points and a prior shape model may be fit to the points; A new narrow band may then be redefined, and the process may be repeated until, for example, there is no change between successive iterations.

At this time, the remaining maxima points may be connected with a closed curve that defines an intermediate boundary. This closed curve may then be expanded and contracted to define a second narrow band region. Tins curve may also define a level set function. The level set function may be initiated by setting image values inside the curve as negative values and image values outside the curve as positive values, or vice versa. In any case, the curve within the second narrow band may be an active contour, and by minimising the level set function, an actual boundary of the structure of interest may be identified.

In conjunction with identification of a boundary, the utility may further include a related aspect wherein boundary calibration is performed. Such boundary calibration may include bump removal processes, smoothing processes and/or bias correction processes. In relation to bump removal processes, the curvature of an identified boundary may be examined to identify irregularities. For instance, when curvature exceeds a predetermined threshold, a start and/or end point of a bump/irregularity in the boundary may be identified. By identifying these start and end points, a smooth curve may be fit therebetween, effectively removing the hump from the curvature. The smoothing process may include identifying, predetermined regions of the prostate and applying correspondingly predetermined smoothing processes for those regions. Finally, bias correction may allow for applying corrections to the final boundary based on differences between the identified boundary and predetermined shape models.

In any aspect, the two-dimensional images may be downsized in order to reduce the processing requirements and thereby enhancing the speed of the segmentation process. For instance, one or more wavelet transforms may be applied to the initial image in order to reduce the size of the image without losing image information. Accordingly, the reduced image size may allow for reducing the total amount for processing. In this regard, segmentation may be performed on the downsized image in order to find a boundary of the structure of interest. Once the boundary is identified, the boundary and/or the downsized image may be rescaled to the original size of the original image. Likewise, the resized boundary may be applied to an original copy of the two-dimensional image in order to illustrate the boundary thereon and/or utilize the boundary for calculation purposes.

According to another aspect, the method for automated center point detection is provided. The method includes obtaining a two-dimensional image including the structure of interest therein. A plurality of lines (e.g., parallel lines) may be extended through the two-dimensional image. A portion of these lines may pass through the structure of interest. By identifying energy intensities along these lines, rough edge boundaries of the structure of interest may be identified along the length of each line. Accordingly, by determining the midpoint of the structure of interest between these edge boundaries in each of these lines, midpoint information for the structure of interest in each line, may be identified. A weighted average of this midpoint information may be utilized to determine a center point for the structure of interest. Furthermore, the process may be repeated for a plurality of two-dimensional slices of a 3-D image. Accordingly, a centroid for the 3-D image may be generated.

Though discussed above in relation to two-dimensional images, it will be appreciated that all of the aspects may be applied to a plurality of two-dimensional images in order to generate information for a common 3-D image/structure.

BRIEF DESCRIPTION OF THE DRAWINGS

FIG. 2b illustrates two-dimensional images generated by the TRUS of FIG. 2a.

FIG. 3b illustrates a downscaled version of the two-dimensional prostate image of FIG. 3a.

DETAILED DESCRIPTION

Reference will now be made to the accompanying drawings, which assist in illustrating the various pertinent features of the present disclosure. Although the present disclosure is described primarily in conjunction with transrectal ultrasound imaging for prostate imaging, it should be expressly understood that aspects of the present invention might be applicable to other medical imaging applications. In this regard, the following description is presented for purposes of illustration and description.

In the process disclosed herein, a prostate capsule volume computation is made with an automated segmentation method using 2-D ultrasound image. In this process, a 3-D ultrasound prostate image is sliced into the series of contiguous 2-D images, in either a rotational manner, about an axis approximately through the center of the prostate, with a uniform angular spacing (e.g., 3°), or in a parallel manner, with a uniform spacing (e.g. 1 mm). Segmentation for the 2D ultrasound images is a complex process due to speckle in ultrasound images and motion artifacts in biopsy applications. In the present process, an automated multi-resolution method is used for the segmentation of the 2D images. This process includes 5 stages of which are novel alone as well as in combination: (a) Down-Sampling of the 2d image, (b) initial boundary estimation, (c) final boundary estimation, (d) boundary correction and, (e) scale-space method for the final boundary. In step (b), an integrated method may be used to obtain the initial boundary: the radial lines emit from a point inside the prostate towards the edge extending into the search region band. Then with the help of ellipse fitting, a prior shape contour it aligned to the initial points. Around the contour, a narrow band is generated. Based on the gradient information in the narrow band (this narrow band is larger than that in the next step), an edge of the prostate is estimated. A prior shape contour is fit to the estimated points as the initial curve boundary. This initial curve is then used as a basis for estimating the second narrow band region, in which the final estimated boundary is computed. In step (c) to refine the boundary of the prostate, the prostate is modeled in another narrow band region as combination of homogeneous regions with different gray levels and the energy functional is minimized based on the regional information of the image. This strategy is implemented in a level set framework. In step (d), a bump removal algorithm is applied which is based on the segmentation results from step (c). A final boundary is determined and applied to the original image.

Figure 1:
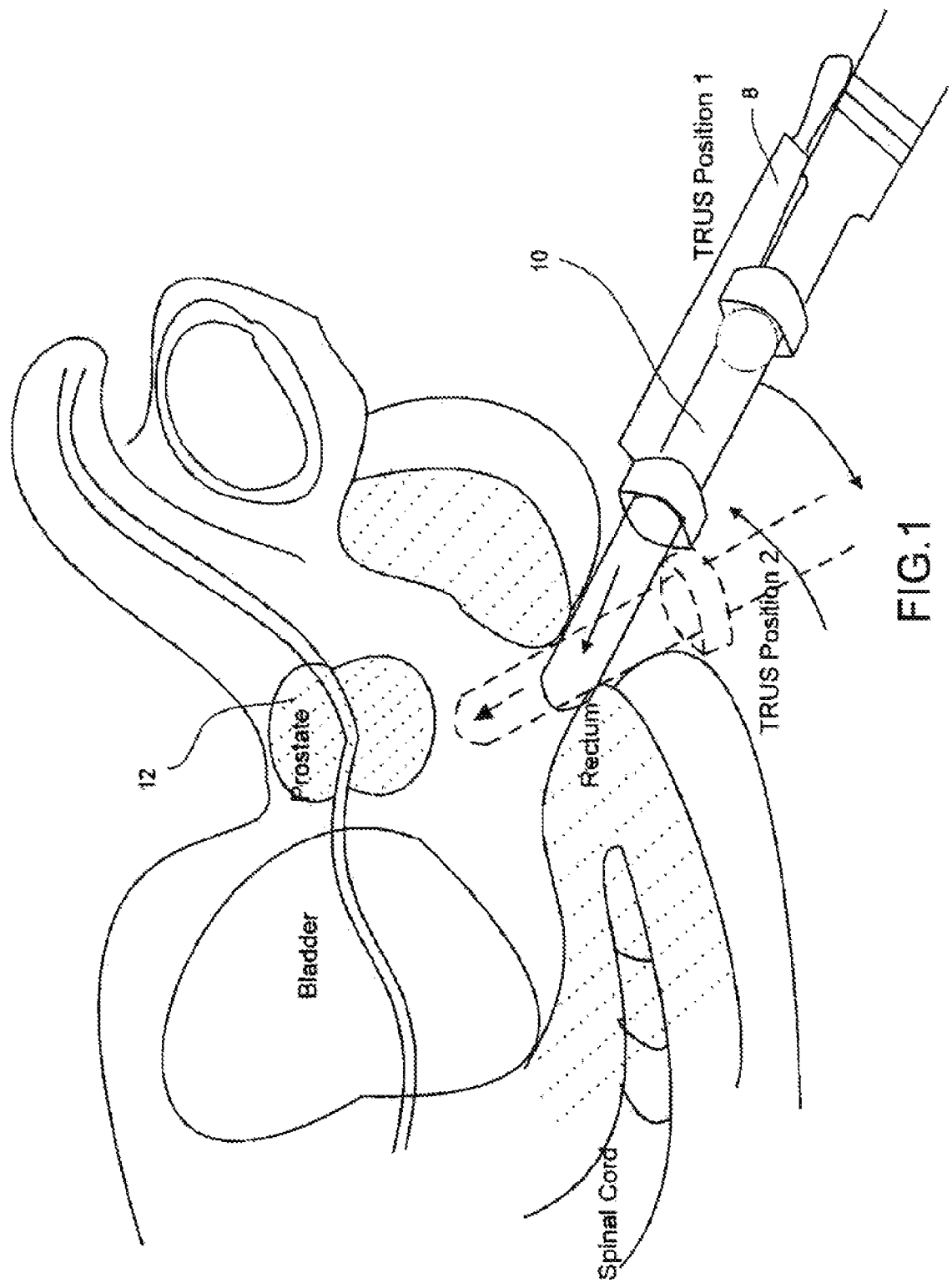
FIG. 1 shows a cross-sectional view of a trans-rectal ultrasound imaging system as applied to perform prostate imaging.
Figure 2A:
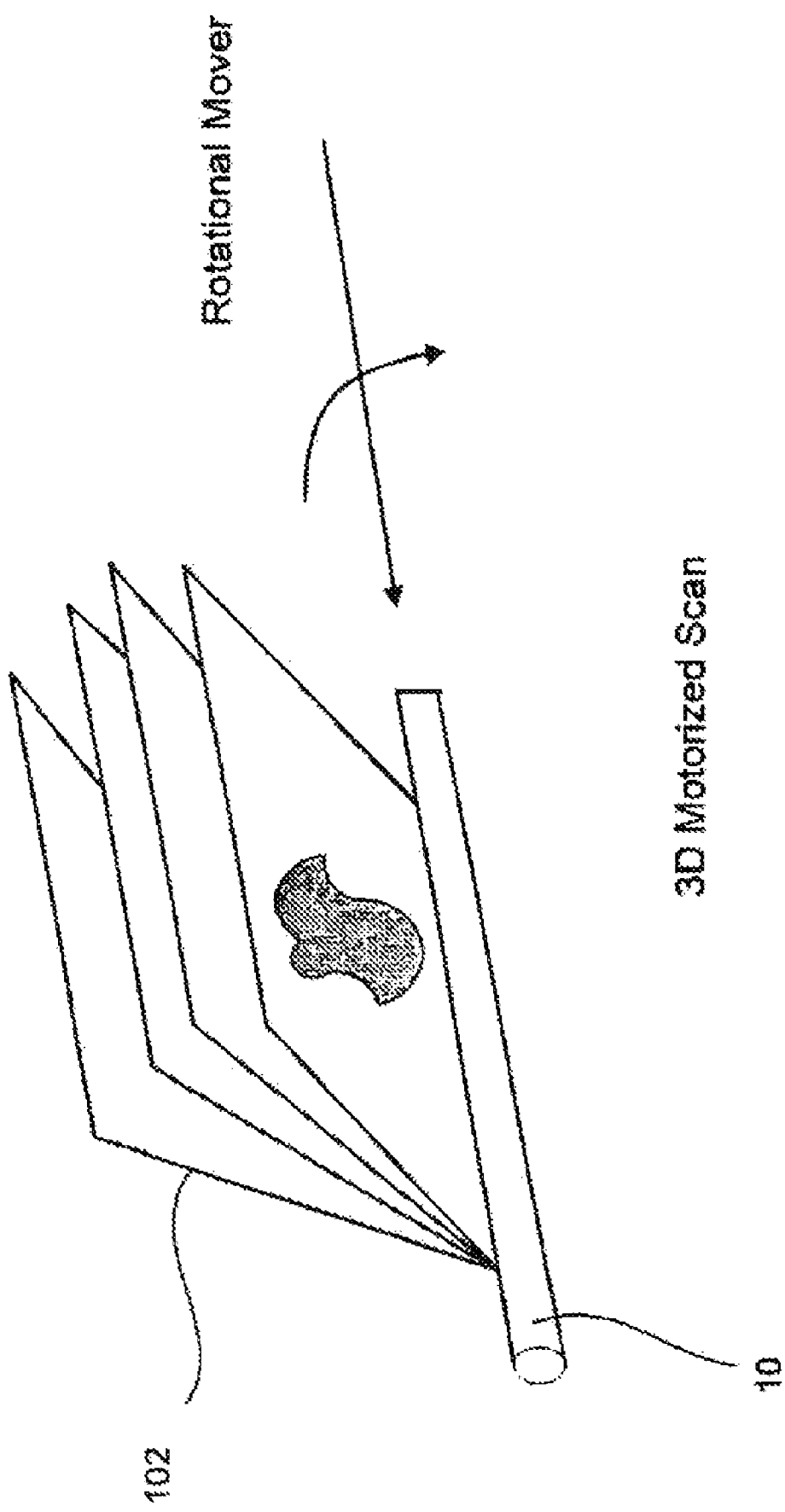
FIG. 2a illustrates a motorized scan of the TRUS of FIG. 1.
Figure 2B:
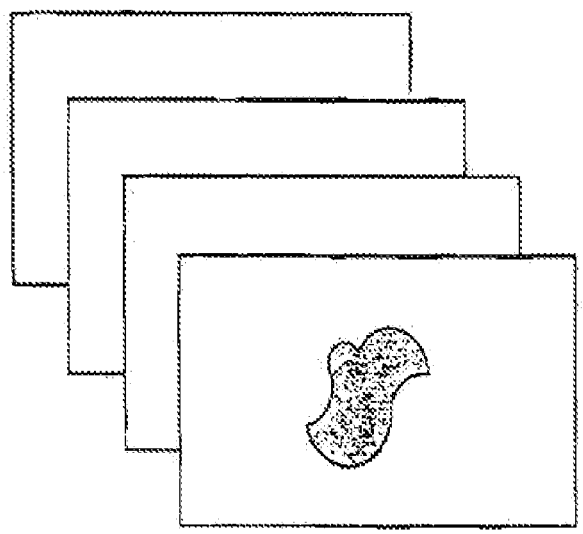
Figure 2C:
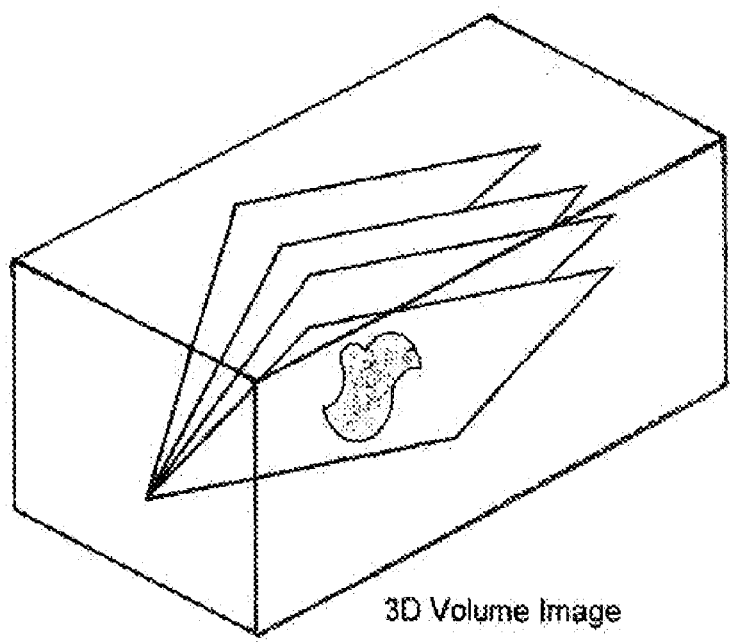
FIG. 2c illustrates a 3-D volume image generated from the two dimensional images of FIG. 2b.

FIG. 1 illustrates a transrectal ultrasound probe that may be utilized to obtain a plurality of two-dimensional ultrasound images of the prostate 12. As shown, the probe 10 may be operative to automatically scan an area of interest. In such an arrangement, a motor may sweep the transducer (not shown) of the ultrasound probe 10 over a radial area of interest. Accordingly, the probe 10 may acquire plurality of individual images while being rotated through the area of interest (See FIGS. 2A-C). Each of these individual images may be represented as a two-dimensional image. Initially, such images may be in a polar coordinate system. In such an instance, it may be beneficial for processing to translate these images into a rectangular coordinate system. In any case, the two-dimensional images may be combined to generate a three-dimensional image (See FIG. 2C), As shown in FIG. 2A, the ultrasound probe 10 is a motorized side scan probe. However, it will be appreciated that an end scan probe and manual scan may be utilized as well. In any arrangement, the probe 10 may also include a biopsy gun 8 that may be attached to the probe. Such a biopsy gun 8 may include a spring driven needle that is operative to obtain a core from desired area, within the prostate. In this regard, it may be desirable to generate an image of the prostate 12 while the probe 10 remains positioned relative to the prostate. In this regard, if there is little or no movement between acquisition of the images and generation of the 3D image, the biopsy gun may be positioned to obtain a biopsy of an area of interest within the prostate 12.

In order to generate an accurate three-dimensional image of the prostate for biopsy and/or other diagnostic purposes, the present disclosure provides an improved method for segmentation of ultrasound images. As will be appreciated, ultrasound images often do not contain sharp boundaries between a structure of interest and background of the image. That is, while a structure, such as a prostate, may be visible within the image, the exact boundaries of the structure may be difficult to identify in an automated process. The system utilizes a narrow band estimation system that allows the specification of a limited volume of interest within an image to identify boundaries of the prostate. This allows for avoiding rendering the entire volume of the image, which may slow the process or be excessively computationally intensive. To further reduce the computational requirements, the present utility may down sample the prostate images prior to segmentation. As may be appreciated, various wavelength transforms may be applied to an image to reduce the data size of the image without substantially affecting (i.e., while preserving) the information within the image.

Figure 3A:
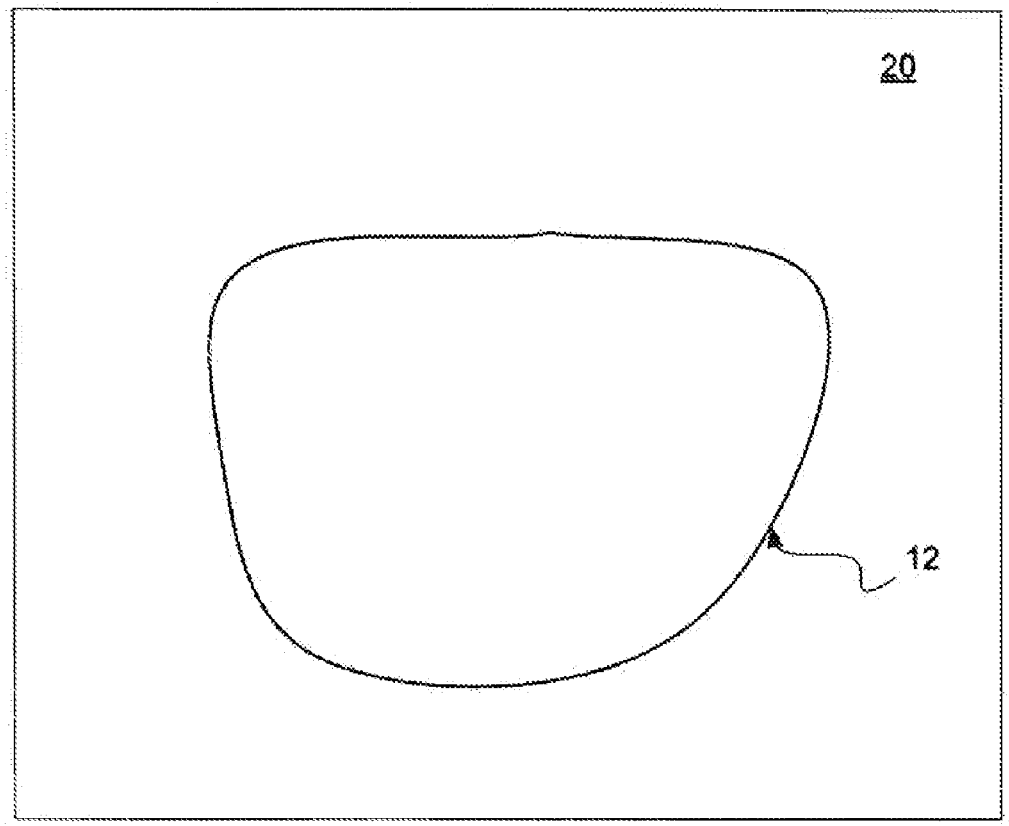
FIG. 3a illustrates a two-dimensional prostate image.

FIG. 3a illustrates a prostate within an ultrasound image. In practice, the boundary of the prostate 12 would not be as clearly visible as shown in FIG. 3a. A wavelet transform is applied to the image 20 to generate a "down-sampled" image 22. See FIG. 3B. Segmentation is then performed on the down-sampled image to identity the boundary of the prostate 12. An inverse transform may then be applied to the down-sampled usage with a segmented boundary to resize the to its original size. The identified boundary may then be applied to the original image. As will be appreciated, such segmentation on the down sampled image reduces the computational intensity and speeds the overall process.

In order to perform a narrow band volume rendering, an initial estimate of the boundary must be obtained. As will be discussed herein, this initial estimation may be provided using gradient and least squares energies as well as using a predetermined shape model, which may be based on age and/or ethnicity of the patient. The shape model may be fit to initial points determined by energies along predetermined radials within the image to provide an initial boundary 12. This initial boundary 12 may be expanded or contracted to generate an inner 14 and outer 16 boundaries See FIG. 3C. The space between these boundaries 14 and 16 defines a band (i.e., the narrow band) having a limited volume of interest in which segmentation may be performed to identify the actual boundary of the prostate 12. It will be appreciated that the band between the initial boundary 14 and outer boundary 16 should be large enough such that the actual boundary of the prostate lies within the band. As will be discussed herein, active contours or dynamic curves are utilized within the narrow band to identify to the actual boundary of the prostate 12.

As discussed herein, an automated boundary estimation system is provided for computing the boundary of the individual ultrasound images (e.g., individual images or slices of a plurality of images that may be combined together to generate a volume). The boundary estimation system is operative to generate boundary information slice by slice for an entire volume. Accordingly, once the boundaries are determined, volumetric information may be obtained and/or a detailed image may be created for use in, for example, guiding a biopsy needle. Further, the system operates quickly, such that the detailed image may be generated while a TRUS probe remains positioned relative to the prostate. That is, an image may be created in substantially real-time.

Figure 4:
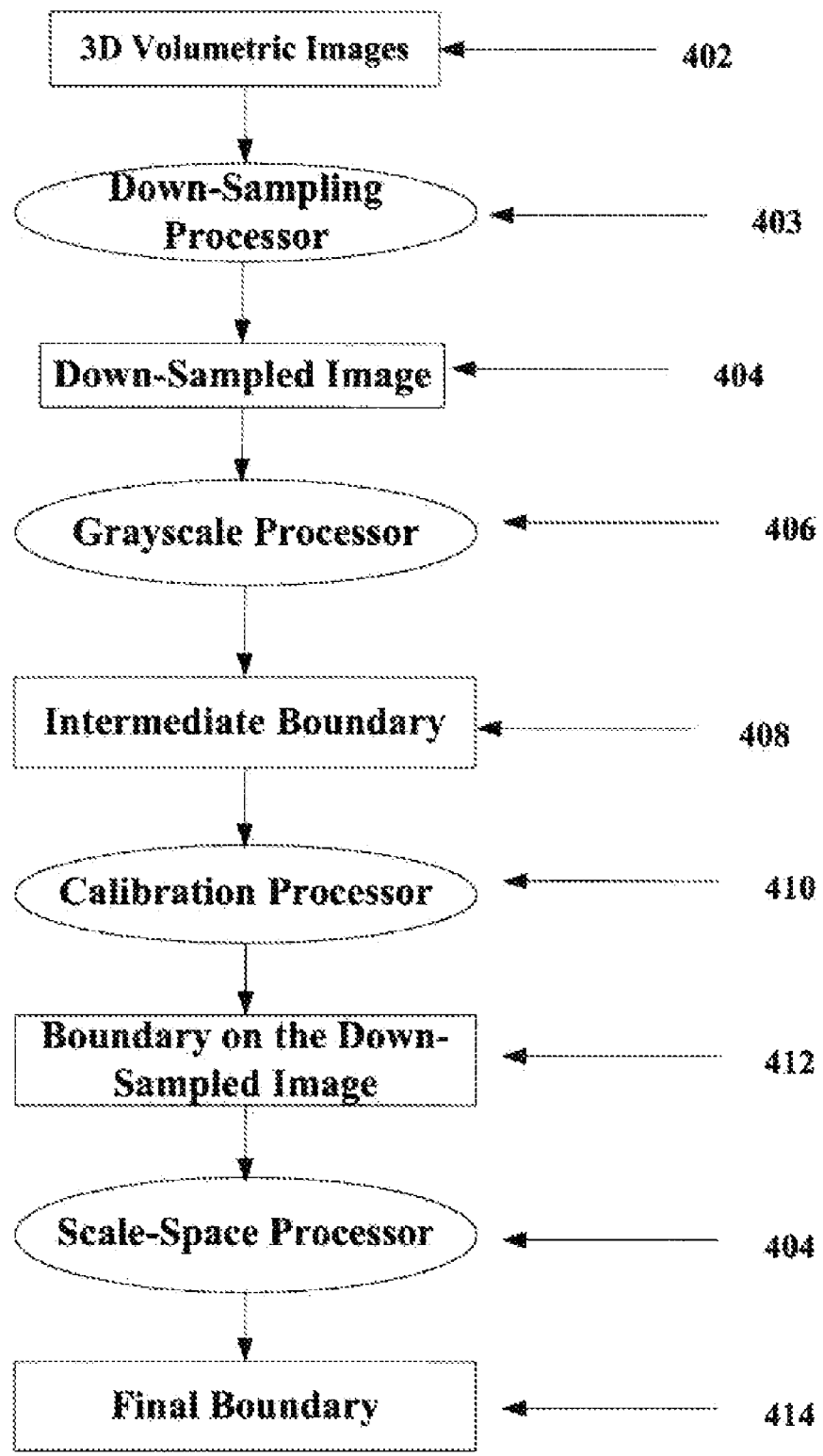
FIG. 4 illustrates a process flow diagram of an overview of the boundary estimation system.

FIG. 4 illustrates an overall architecture for the system. Initially, 3-D volumetric images are acquired 402. These images are then down-sampled 404 to generate down-sampled images. As noted above, such images retain important information regarding the boundary of the prostate while being reduced in size. Once down-sampled 404, the down-sampled images are provided to a gray scale processor 406. As will be discussed herein, the gray scale processor generates an intermediate boundary 408. The intermediate boundary is provided to a calibration processor 410. The calibration processor utilizes a priori knowledge (e.g., a shape model) in conjunction with narrow band processing in order to identify a final boundary on the down-sampled image 412. The boundary on the down-sampled image 412 is then provided to a scale space processor 414 (e.g., an inverse wavelet transform processor). This processor 414 expands the down-sampled image to its original size such that the boundary contained within the resized image may be applied to the original image as a final boundary 436. As will be appreciated, the above process 400 may be applied to individual slices within a 3-D volumetric image. For instance, the process may initially be performed on the central slice of the image, and then segmentation may be performed on individual slices, moving from the center outwards. In any case, the process 400 allows for automatically generating a segmented volume from a 3-D image, such as a prostate.

Figure 5:
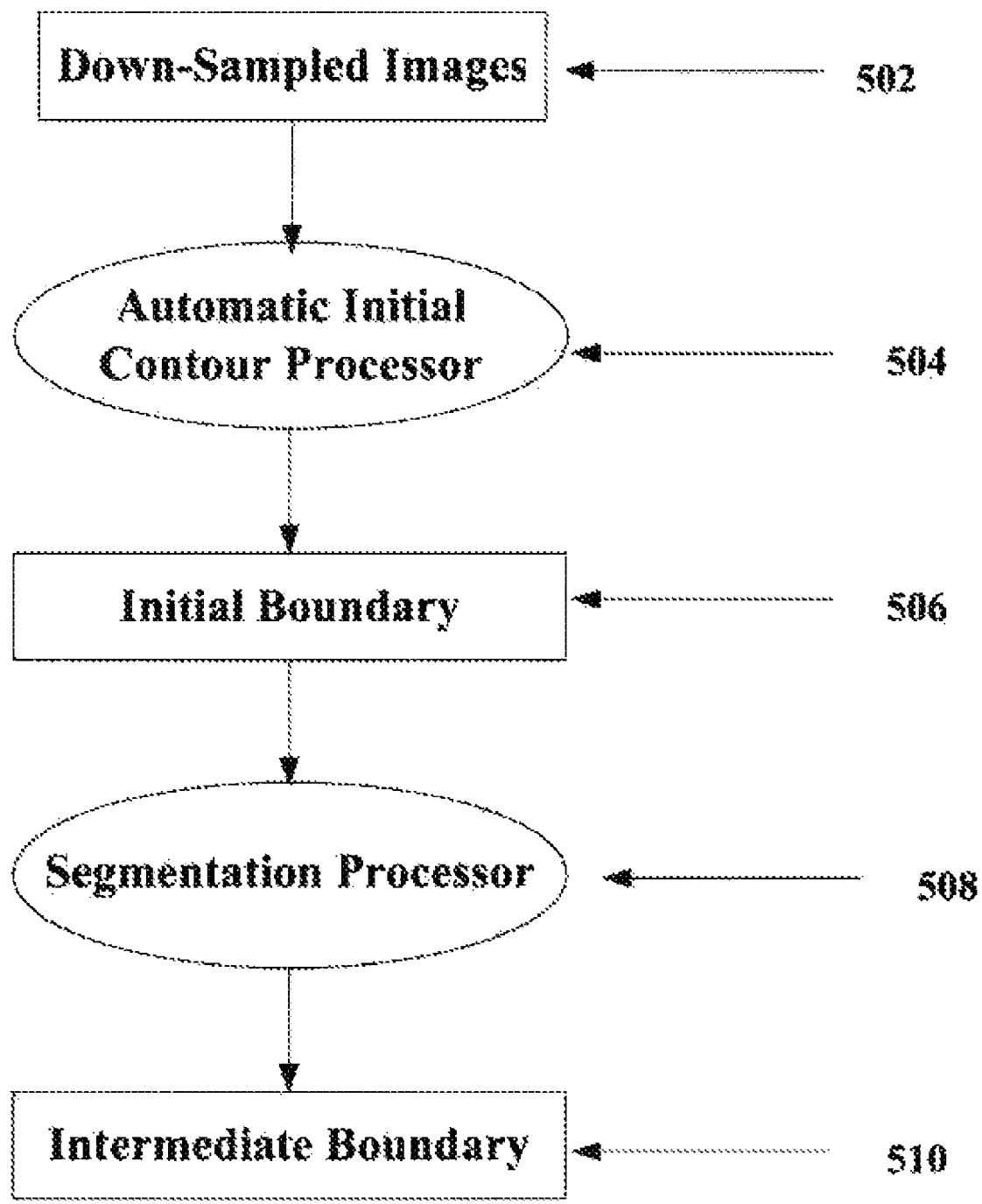
FIG. 5 illustrates the operation of the gray scale processor.

The gray scale processor 406 of FIG. 4 is further illustrated in FIG. 5. As shown, the gray scale processor 406 receives tile down-sampled images 502 and performs an automated initial contour processing step 504 on those images. This generates an initial raw boundary 506. This initial/raw boundary 506 is, as will be discussed herein, utilized with a segmentation processor to perform a first narrow band segmentation process that results in an intermediate boundary, which is utilized in a second narrow band segmentation process.

Figure 3B:
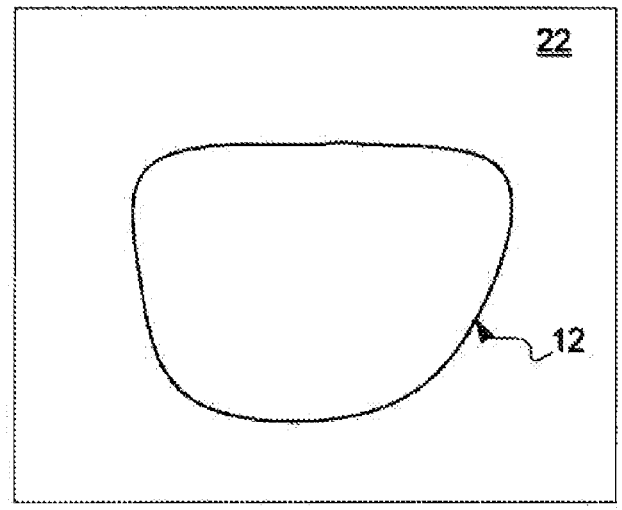
Figure 3C:
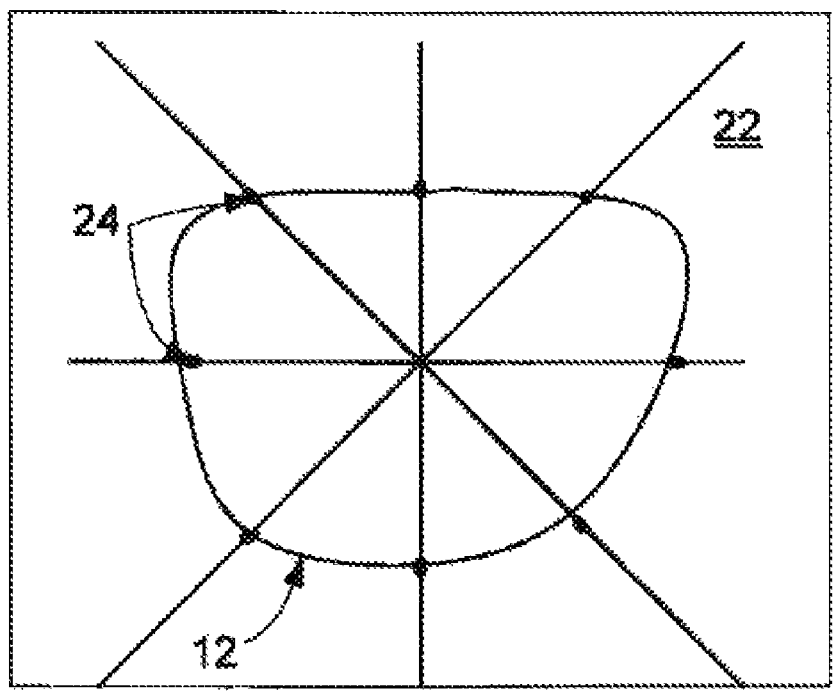
FIG. 3c illustrates the two-dimensional prostate image of 3a having radial lines extending from an identified center point and a narrow band region.
Figure 6:
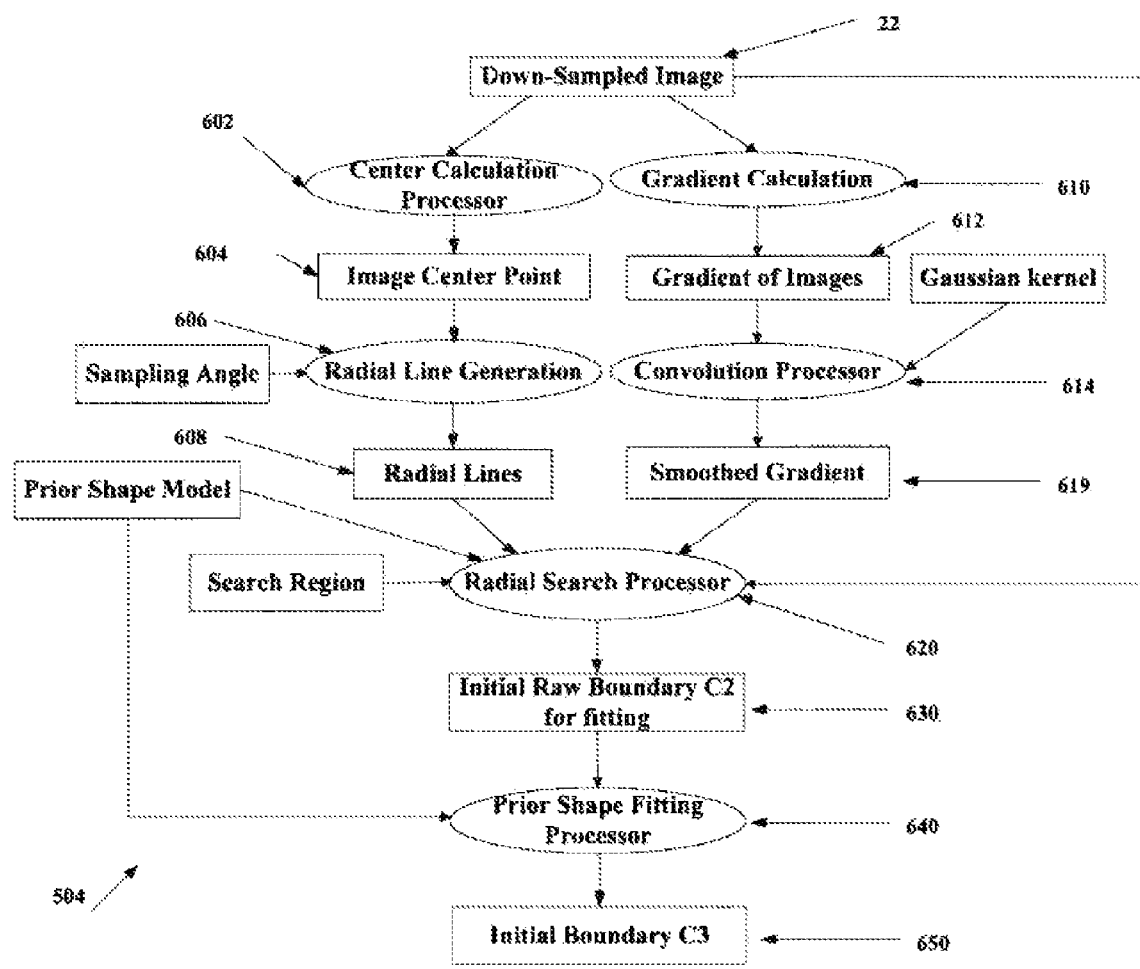
FIG. 6 illustrates an automatic initial contour processor.

The automatic initial contour processor 504 is further illustrated in FIG. 6. Generally, the automatic initial contour processor 504 identifies a center point of a prostate image 602, extends radial lines from that point 604 and identifies potential points along the radial lines that are indicative of a change in contrast (i.e., gradient) along the line that is indicative of a boundary between the prostate and surrounding tissue. Such identification is performed in a radial search processor 620. FIG. 3C illustrates a prostate image where a center point is established and radial lines are extended outwardly. The radial lines are generated at a predetermined sampling angle. As shown, few radial lines are illustrated. However, it will be appreciated that, in practice, many radial lines (e.g., at 3° offsets) may be utilized.

In conjunction with the identification of the center point and radial line generation, a gradient calculation 610 is performed. This gradient calculation provides a gradient 612 of the images and a convolution processor 614 smoothes the gradient image using a Gaussian kernel. In this process, we used a 1-D convolution strategy instead of the 2D convolution, which is more time consuming. This produces a smoothed gradient image 616, which is provided to the radial search processor 620. The purpose of smoothing the image is to low-pass filter the ultrasound images to substantially eliminate the high-frequency noises and speckles. The radial search processor utilizes the center point, radial line and gradient information to generate a raw boundary 622, as will be further discussed herein. This radial search processor 620 generates an initial raw boundary for fitting.

Center Calculation Processor

Figure 7:
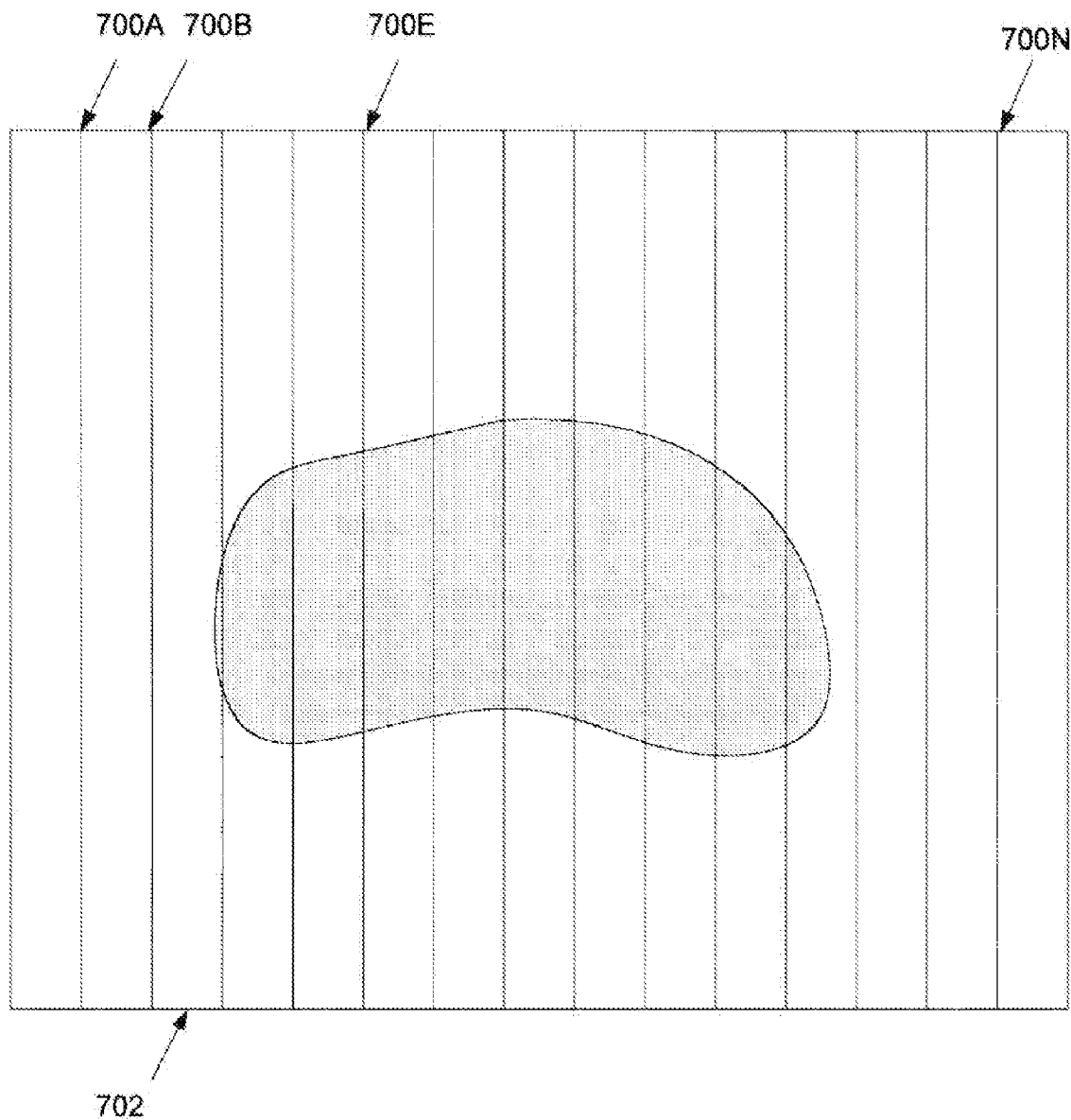
FIG. 7 illustrates an initial step in the center calculation processor.
Figure 8:
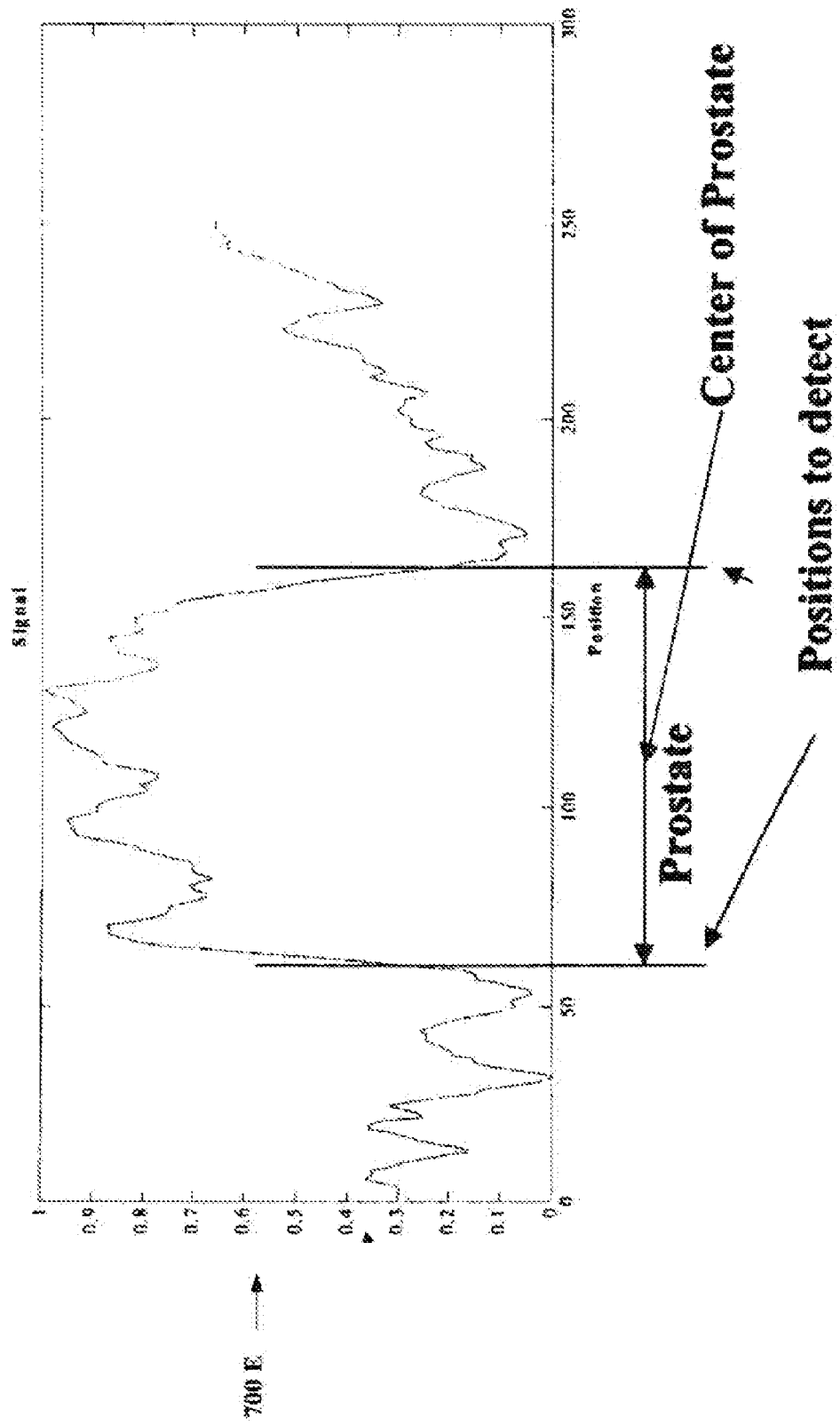
FIG. 8 illustrates the signal intensity of lines generated by the center calculation processor.
Figure 9:
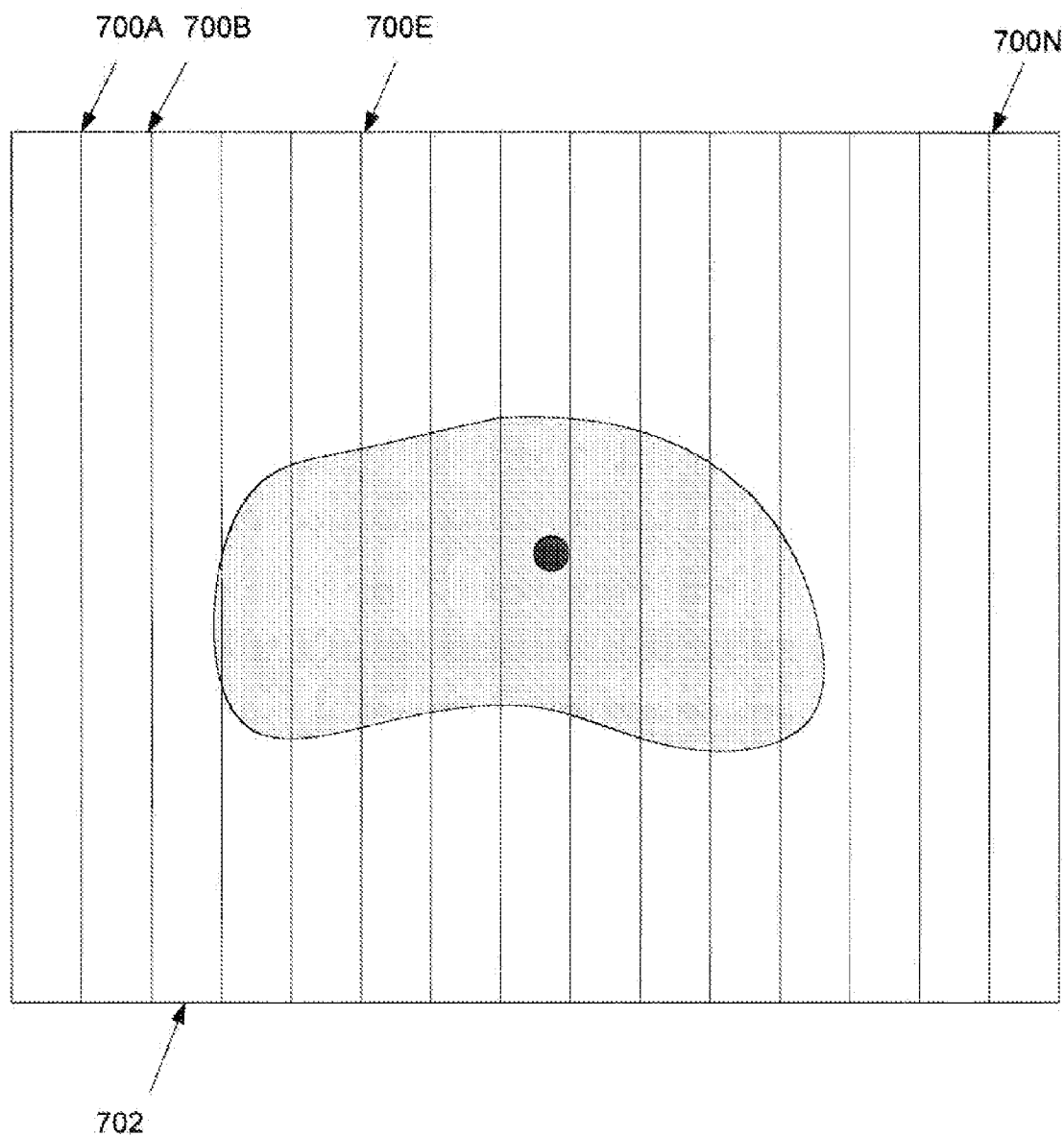
FIG. 9 illustrates the automatic identification of a center point within a prostate image.

The center calculation processor utilizes a down-sampled imaged to automatically detect the center point of that image. As shown in FIG. 7, the processor takes a two-dimensional image 702 and generates a series of parallel lines 700A-N that extend through the image, including the area in which the prostate 12 is located. Next, the processor takes a windowed average of the image intensity to form a signal in each line 700, as illustrated in FIG. 8, which shows a signal for one of the lines 700E extending through the prostate 12. As shown, the intensity of the signal where the portion of the line that passes through the prostate 12 is significantly changed in relation to the intensity of the signal passing through adjacent tissue. Accordingly, a center point of this portion of the signal may be determined. See FIG. 9. For instance, for noisy lower images, a square wave may be fit to each signal, and the center of the square wave may be identified as the center for that signal.

To fit the square wave the cost function we needs to minimized with regards to the positions.

$$E(p) = \int_{B1}^{\sigma} (f(x) - h1)^2 dx + \int_{\sigma+w}^{B2} (f(x) - h3)^2 dx + \int_{a}^{\sigma+w} (f(x) - h2)^2 dx \quad (1)$$

Where B1 and B2 are the boundaries of the signal, a and w are the positions to detect, h1, h2 and h3 are the average values in the integration region.

Taking derivatives of the function;

$$\begin{cases} \frac{\partial E}{\partial a} = 2 * f(a+w)(h3 - h2) + 2 * f(a)(h2 - h1) \\ \frac{\partial E}{\partial w} = .5 * (h2 - h3)(h2 + h3 - 2f(a+w)) \end{cases} \quad (2)$$

Using a gradient method, optimal positions are searched for and the prostate center is the square wave center.

For the real image data, based on these weighted averages, the center point for each two-dimensional image may be determined. Further, the information from the plurality of two-dimensional images may be combined to identify a centroid of the three-dimensional image. As will be appreciated, this process allows for the automatic center point determination within the prostate. This in conjunction with the radial line generation and edge point detection, described herein, allows for full automation of the segmentation process.

Accordingly, once this center point/centroid is identified, radial lines may be generated (See FIG. 6). FIG. 3B illustrates radial lines extending outwardly from the identified center point of the image. This information (i.e., the radial lines and center point) is provided in conjunction with the gradient calculation information to the radial, search processor 620.

Figure 10:
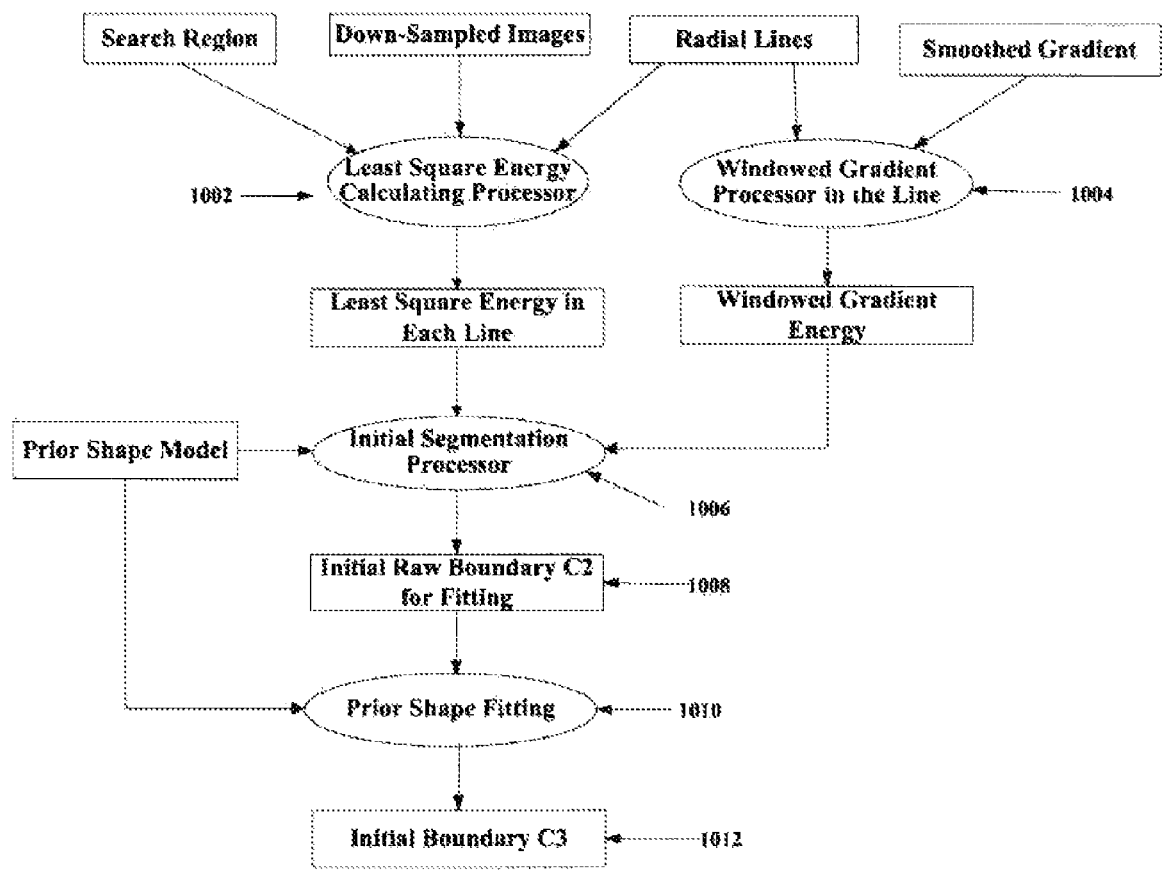
FIG. 10 illustrates generating intensities of radial lines on a prostate image to identify potential edge points for a raw boundary.

The radial search processor is illustrated in FIG. 10. In this regard, for each radial line and down-sampled image, a least-squares calculation process 1002 is performed. In conjunction with the least-squares calculation, a windowed gradient process 1004 is performed to generate a window gradient energy value for each radial line. The least squares process is performed in the image domain to obtain the least square energies. The energy is defined as:

$$E_{LS}(p) = A * G(p) - B * \left[ \sum_{j=1}^{p} (s(i) - C_1)^2 + \sum_{j=p}^{N} (s(j) - C_2)^2 \right] \quad (3)$$

Here, G is the windowed gradient; s is the signal obtained by windowed average; p is the position to separate the signal; N is the total number of signal points; $C_1$ and $C_2$ are the average values of each signal parts; and A and B are the weights of the two energy terms with the same value 1. Note that the first term is the windowed gradient value at position p, and the second term is the least square value of a piece-wise constant approximation of the signal.

The goal is to maximize the following energy at each of the radial lines:

$$E_{tot}(i) = E_G(i) - E_{LS}(i) - c*E_{CL}(i) \quad (4)$$

Where $E_G$ is the gradient energy, $E_{CL}$ is the contour length energy, and c is the weight of be contour length energy is called the external energy. $E_G$ and $E_{LS}$ are independent of other points of the contour, while $E_{CL}$ (internal energy) is dependent with other points. Since the necessary condition of the position where edge point resides is that the energy term be a local maxima.

Figure 11:
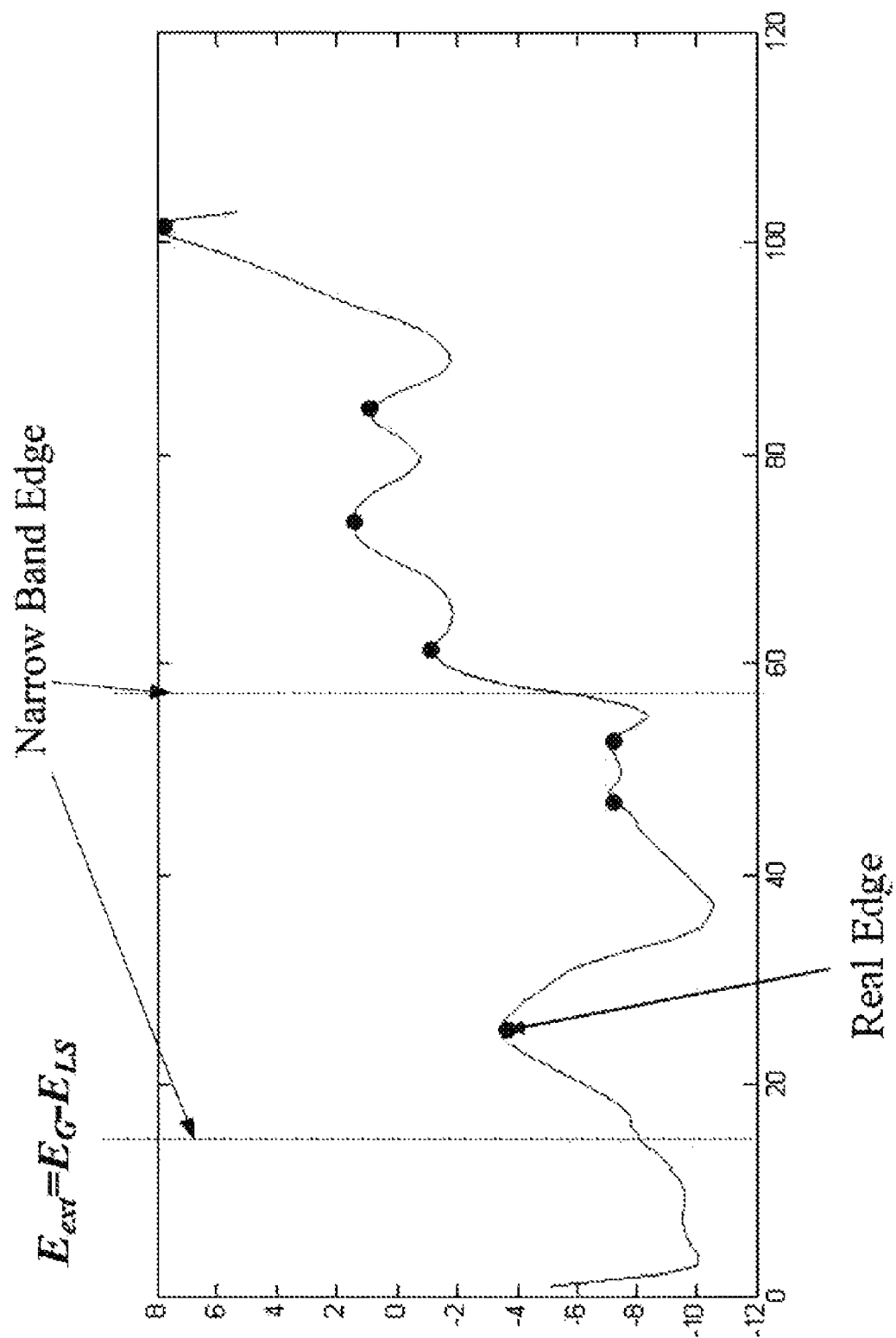
FIG. 11 illustrates the maxima along a radial line.
Figure 12:
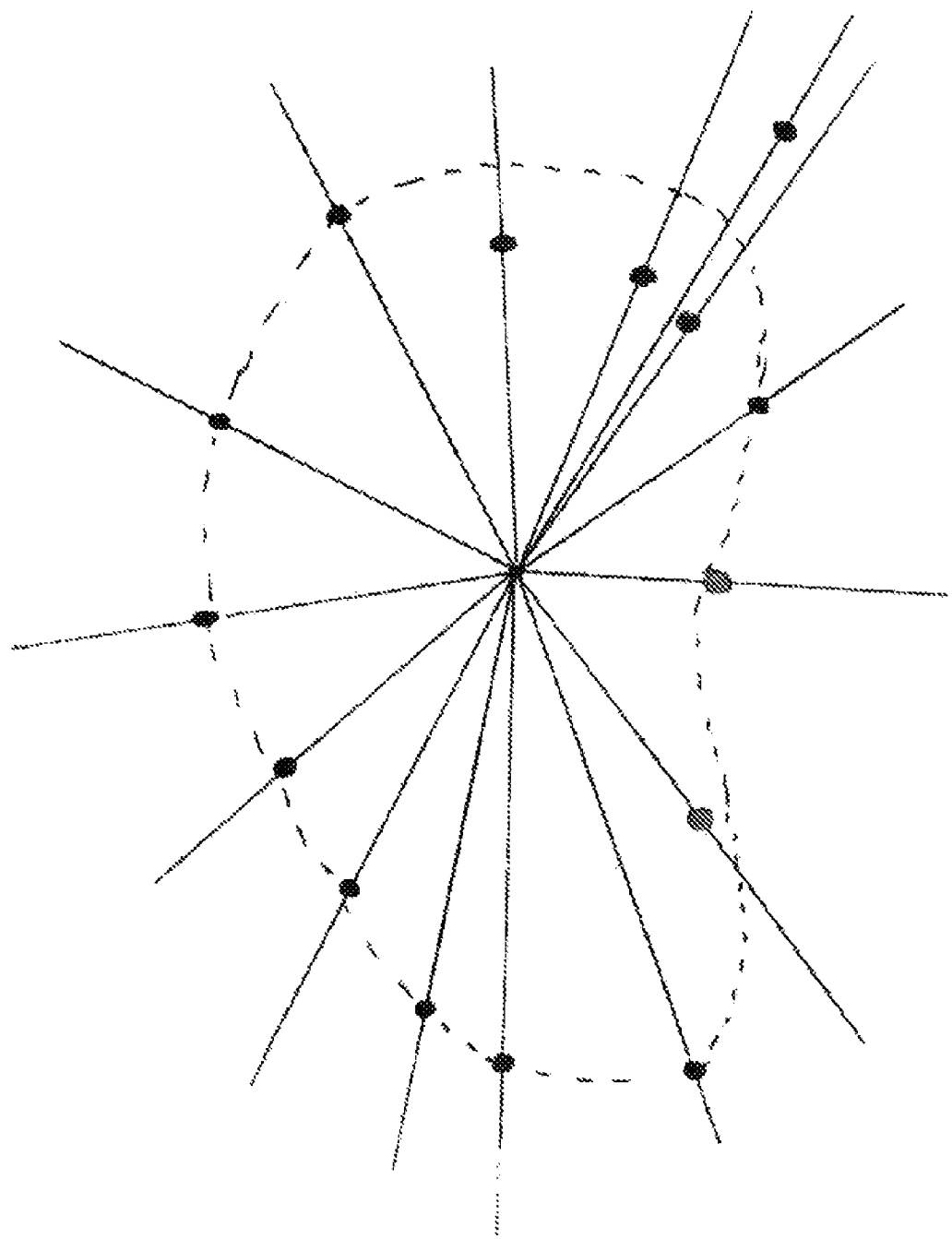
FIG. 12 illustrates potential edge points plotted in relation to the actual edge of a prostate.

That is, the windowed gradient energy and least-squares energy is calculated for each radial line. These two energies are added together and represent an indication of the energy along the radial line. This is performed in an initial segmentation processor 1006. The initial segmentation processor 1006 may smooth the energy curve with a low pass filter to find local maximum along the radial lines, which are candidate positions for the actual edge of the prostate. Such a smoothed radial line with multiple maxima is illustrated in FIG. 11. Initially, the highest energy candidate points are selected for each radial line and plotted on the image, see FIG. 12. For many of the radial lines, the highest energy candidate point often falls at or near the actual boundary of the prostate and surrounding tissue. However, due to speckling and artifacts, gradient changes exist within the prostate. That is, the prostate is not itself homogenous as such artifact or other speckling can result in the highest energy candidate point in one or more radial lines being either inside and/or outside of the actual boundary of the prostate. However, the initial points define a raw boundary 1008. The raw boundary is utilized with a prior shape model 1010 in order to generate an initial boundary 1012, as will be further discussed herein.

Shape Model

A shape model may be generated from a database of ultrasound volumes. Such ultrasound volumes may be compiled and segmented either manually or using a segmentation program to obtain several prostate ultrasound surfaces. These surfaces can be used to train a shape model. A shape model may include a mean shape and one or more vectors (e.g., Eigen vectors) that correspond to the principal modes of variation. The projections on these vectors can then be used to describe any shape resembling the training data accurately. The advantage of using shape models is that these projections may represent the direction of largest variance of the data. For instance, 10-15 such projections may adequately represent a large range of shapes accounting for more than 95% of the variance in the data. The projections can be either directly optimized to maximize the similarity between the given shape and the model or the model can be allowed to warp freely and can then be constrained by the requirements of the model that prevent the model from fitting (e.g., warping) into shapes that do not resemble a prostate. The generation and applications of such a shape model are further discussed in co-pending U.S. application Ser. No. 11/740,807, entitled, "Improved System and Method for 3-D Biopsy," filed on Apr. 26 2007, the entire contents of which are incorporated herein by reference.

Figure 3D:
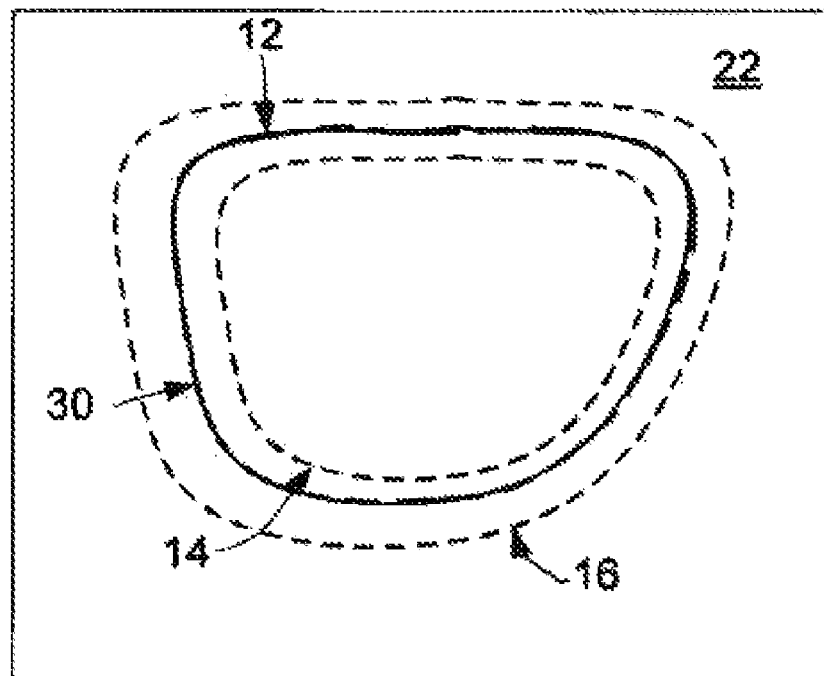
FIG. 3d illustrates capture of the prostate boundary in a narrow band region.
Figure 13:
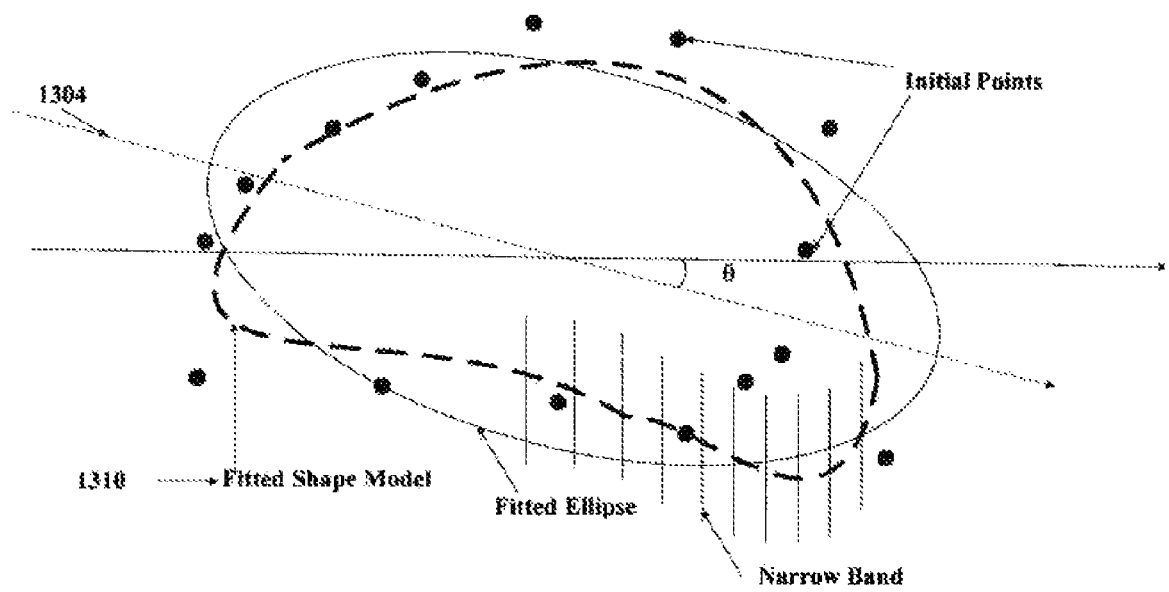
FIG. 13 illustrates fitting an ellipse to the initial points identified in relation to the maxima of the radial lines.
Figure 14:
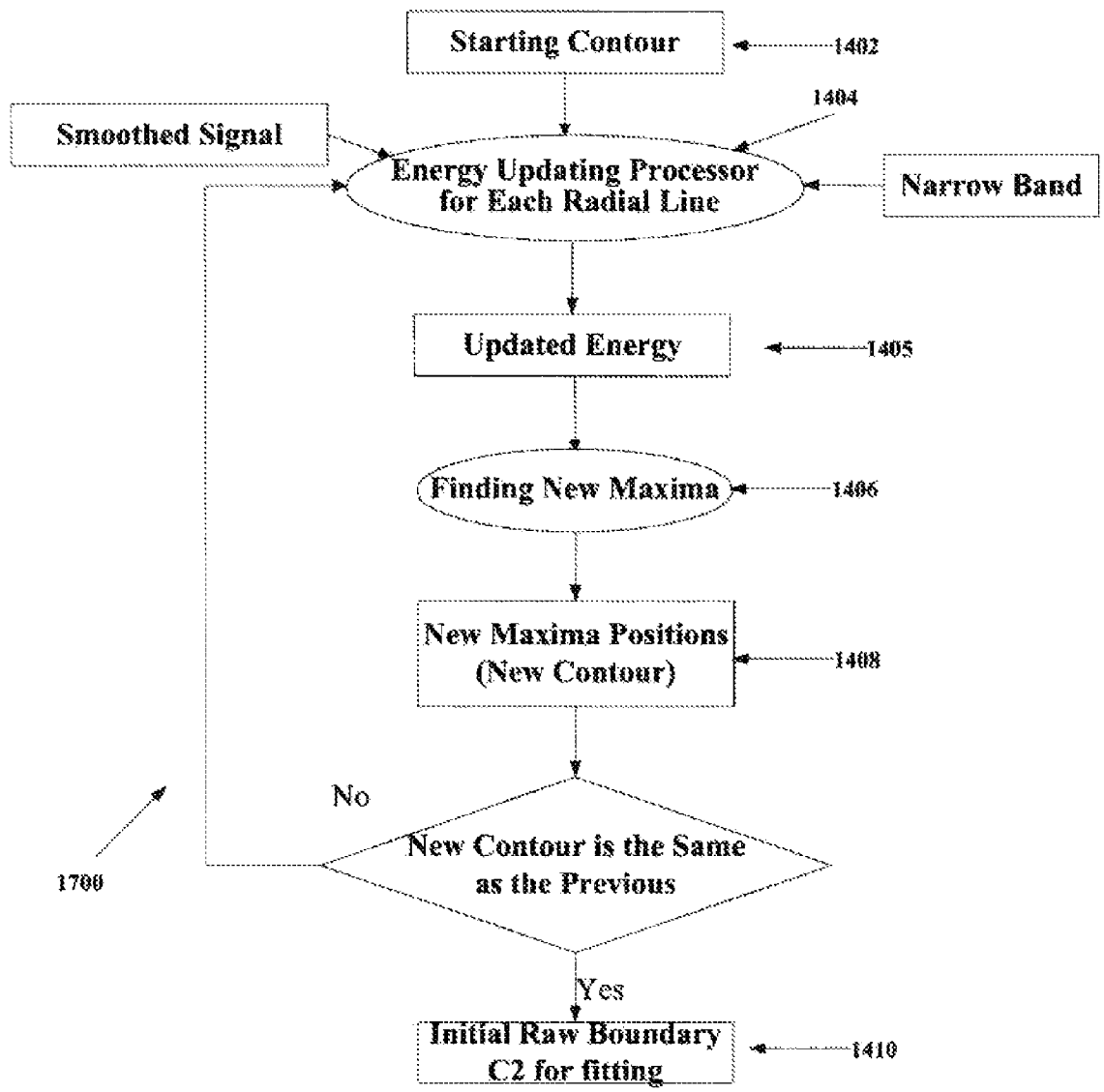
FIG. 14 illustrates ail iterative process for determining a raw boundary.

As noted above, the shape model finds an average shape for the prostate. However, prior to applying the shape model to the raw boundary defined by the initial points, the shape model must be aligned to a common frame of reference with the initial points. In this regard, an ellipse is fit to the initial maxima points in each radial having the largest energy value. As will be appreciated, the prostate is typically walnut-shaped, and an ellipse may be fit to a prostate in a common manner from prostate image to prostate image. Accordingly, as illustrated in FIG. 13, by fitting an ellipse 1302 to the initial maxima points defining the raw boundary, a reference axis 1304 may be generated. Accordingly, the shape model 1310 may be overlaid onto the image, including the initial points, based on the long axis of the ellipse and/or the center point of the ellipse. The contour of the shape model 1310 may then be utilized to define a narrow band. That is, the shape model 1310 may be expanded and contracted to define a narrow band that includes the actual boundary of the prostate. See e.g., FIG. 3D. As illustrated in FIG. 11, once the narrow band is defined, the narrow band may be applied to the smoothed signals containing the identified maxima (i.e., the combination of least-square and gradient energy). As shown, a number of the candidate positions fall outside of the edges of the narrow band and may be ignored. Accordingly, positions with maximum energy within the narrow band for each radial may then be selected to define an initial boundary/contour 1012 (See FIG. 10).

More specifically, an iterative process 1400 may be performed using a contour 1402 defined by maxima points in the narrow band. Energy may be updated 1404 for each radial line within the narrow band, and a new maximum may be found 1406. Accordingly, for the new maximum positions, a new contour 1408 may be generated. If the new contour is the same as the previous contour, the initial boundary is determined 1410. Alternatively, if the new contour is different from the previous contour, the process may be repeated, and new energy calculations may be made for each radial line and a new contour may be generated. This process may be repeated until little or no change occurs between successive contours. Once completed, the raw boundary is generated.

However, such a raw contour may include bumps or other deformities. In this regard, such bumps may result from selection of the incorrect maximum within the narrow band region. That is, the bump may be caused by speckles, shadows or dim edge information where the external energy is very low. However, it is recognized that these bumps may be removed by connecting the surface of the contour at either end of either bump with an appropriate curve. Bumps are automatically detected utilizing a threshold of change along the contour length. In this regard, a curvature calculation is performed on the initial raw boundary. Along a predetermined length of the contour, if a change in the curvature exceeds a predetermined threshold, the beginning of a bump region is identified. Likewise, the end of the bump region may be determined. Once the ends of the bump region are determined, they are replaced with a smooth curve. At this time, the initial raw boundary 630 is completed. See FIG. 6. Accordingly, the prior shape model may be applied to the initial taw boundary and expanded and/or fitted 640 to the raw boundary. At this time, the fitted shape model defines an initial boundary 650.

Figure 15:
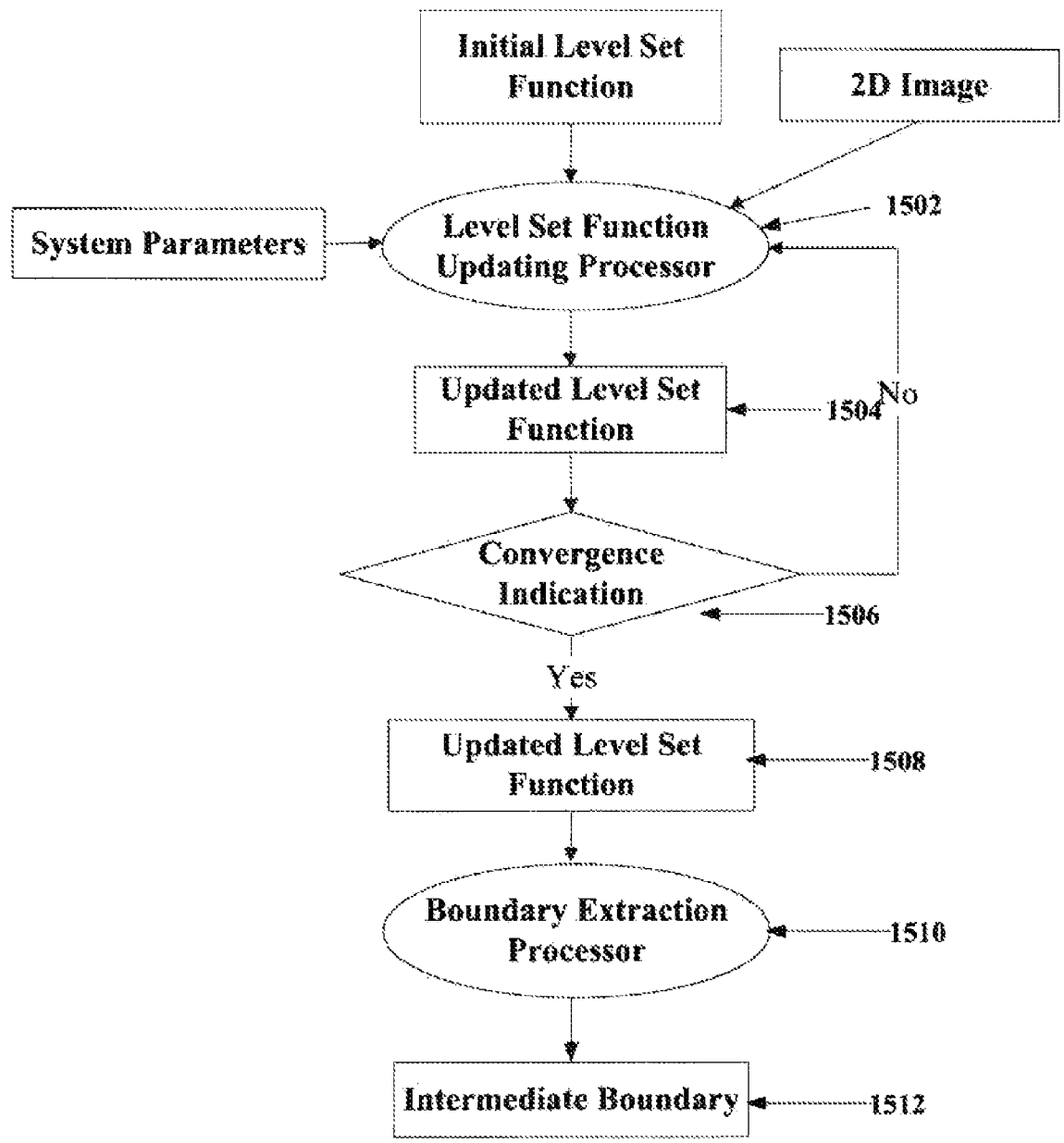
FIG. 15 illustrates updating a level set function.

Referring again to FIG. 5, it is noted that once the initial boundary is generated 506, this initial boundary is provided to a segmentation processor 508. The segmentation processor utilizes the initial boundary to generate the narrow band region. That is, the system expands the initial boundary outward in order to form an outer contour and contracts the initial boundary inward to define an inner contour. See FIG. 3C. The actual boundary of the prostate lies within the resulting narrow band. Further, portions of the image that are outside of the narrow band define an outer region, and portions that are inside the narrow band define an inner region. The narrow band region is provided in conjunction with the original two-dimensional ultrasound image to a mask image generation system. The mask image generation system takes pixels from the two-dimensional image in the narrow band for subsequent processing. The system for defining a narrow band and obtaining a mask image is provided in U.S. patent application Ser. No. 11/615,596 entitled, "Object Recognition System for Medical Imaging," the entire contents of which are incorporated by reference herein. This masked image, along with the inner and outer regions, the narrow band and the initial level set function are provided to a narrow band boundary estimation processor, as illustrated in FIG. 15. Generally, the boundary estimation system utilizes active contours within the narrow band to delineate between the background and the boundary of interest (i.e., prostate)

Active contours, or "snakes", are dynamic curves or surfaces that move within an image domain to capture desired image features. Lots of edge detection works are done based on the "snakes" model in the present process, the level set method is applied. In this method, the boundary of the object is implicitly expressed as the zero level of a 3-dimensional function, which is called the level set function. In the present process, a modified version Chan-Vese's "Active contour without edge" model is used in which the images are modeled as "piecewise constant". The method is based on the knowledge about the ultrasound prostate images that the gray levels of the object region and the background region are different, and in the object region, the pixels are more "homogeneous". The purpose of the method is to find out the minimum of the cost function:

$$E = \int_\Omega m|\nabla H(F)|dxdy + I_1 \int_\Omega (I_0 - C_1)^2 H(F) dxdy + I_2 \int_\Omega (I_0 - C_2)^2 (1 - H(F)) dxdy + Pt \quad (5)$$

Where the F is the level set function, $I_0$ is the image at pixel (x, y), $C_1$ and $C_2$ are the average intensity in the inner and outer regions, which are separated by the contour, the others are the weights of the terms. Pt is the penalty term, which is new in our application:

$$Pt = \quad (6)$$
$$p\int_\Omega (1 - |\nabla F|)^2 dxdy + s \int_\Omega [I(\text{in})(1 - H(F)) + I(\text{out}) \cdot H(F)] dxdy$$

where the first integration is the penalized term for keeping the level set function as signed distance function, which is also represented by P. The second integration is the penalized term to keep the level set function as a single connected curve, which is also represented by S. And s and p are the weight of each term. In the inner region (e.g., inside of the boundary within the narrow band), the level set function value will be kept as negative, while in the outer region (e.g., outside of the boundary within the narrow band), the level set function will be positive. The second term can avoid the "bleeding" of the contour and keep the contour continuous in the narrow band.

Basically the need is to take the gradient of the functional according to F and find the steepest descent, and then perform the finite difference calculation for updated F. After certain iterations, F will converge.

$$F_{n+1} = F_n + dt[\text{Delta}(F_n)(I_1)I - C_1)^2 + I_2(I - C_2)^2 + m_1 C(F) + sS(F)) + pP(F)] \quad (7)$$

After the final level set function F, is obtained, the edge can be obtained by getting the zero level set of F. There will be some irregularities in the final contour, however, down sampling the contour can make a smooth connection as the estimated boundary.

FIG. 15 shows a process flow sheet of the boundary estimation processor. Generally, the processor calculates finite difference iterations. Utilizing system parameters, the 2D image and the initial level set function, a level set function updating processor 1502 performs a finite different calculation with a function F. For each difference calculation, F is updated to generate ah updated level set function 1504. This process is repeated until there is convergence indication 1506. At such time, the updated level set function 2609 is output to the boundary estimation extraction processor 1510, which utilizes the information to generate an intermediate boundary 1512 (i.e., by getting the zero level set of F). The intermediate boundary represents the conformance of the function F (which prior to iteration was represented by the initial boundary). That is, the segmentation processor 508 generates an intermediate boundary 510. See FIG. 5. Referring again to FIG. 4, it is noted that the intermediate boundary 408 is then provided to a calibration processor 410.

Correction Process

Figure 16:
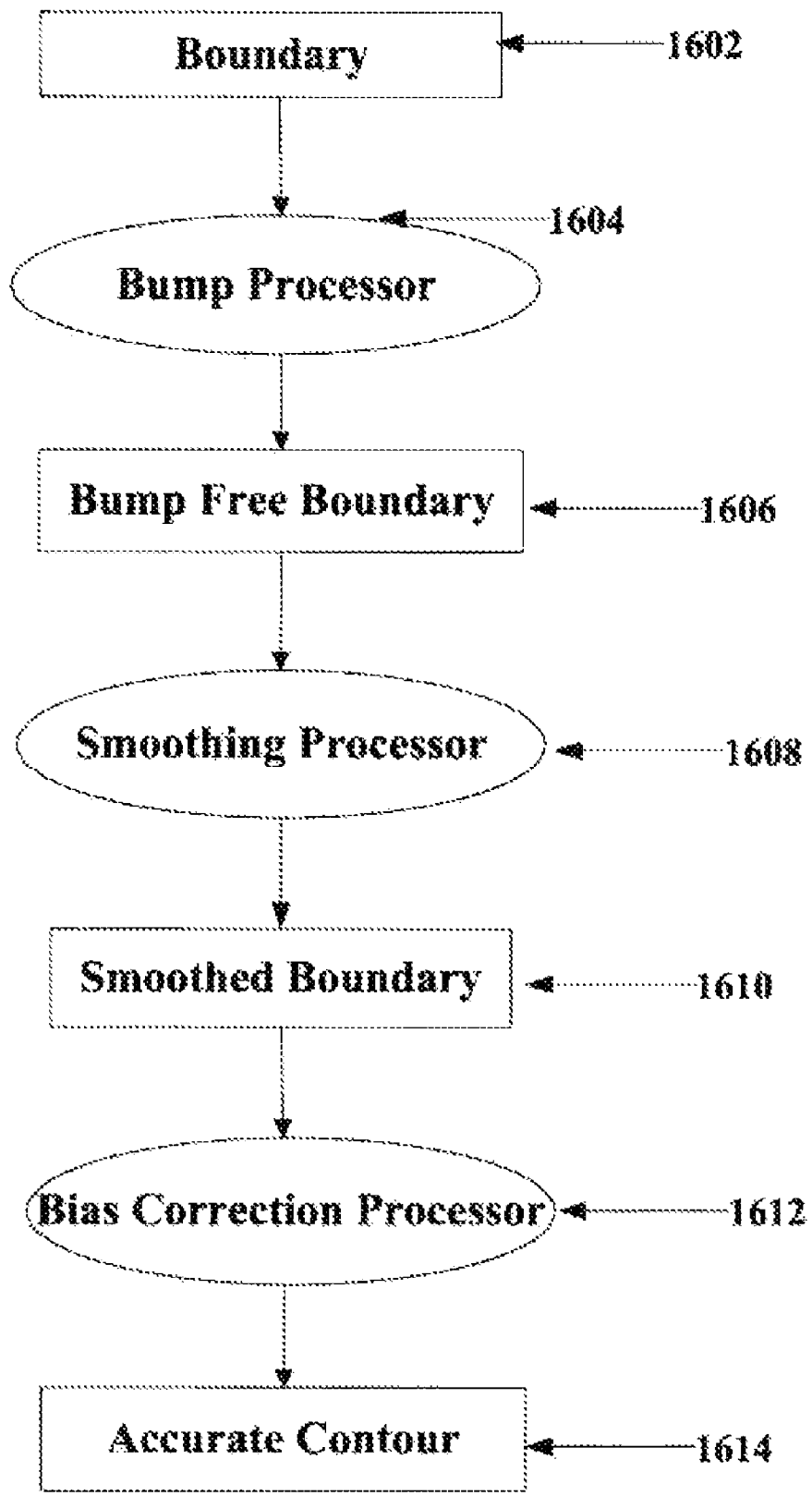
FIG. 16 illustrates a correction process utilized by the calibration processor.

The calibration processor 410 provides a number of corrections to the intermediate boundary. Specifically, the process includes a bump removal process, a smooth boundary estimation process, as well as bias correction for a given imaging probe. These processes are illustrated in FIG. 16, which illustrates the processes performed by the calibration processor 410. As shown, the processor 410 receives the intermediate boundary 1602. This intermediate boundary is provided to the bump processor 1604, which generates a bump free boundary 1606. The bump free boundary is then provided to the smoothing processor 1608, which generates a smoothed boundary 1610. This smoothed boundary may then be provided to a bias correction processor 1612 in order to generate an accurate contour/boundary on the down-sampled image.

Figure 17:
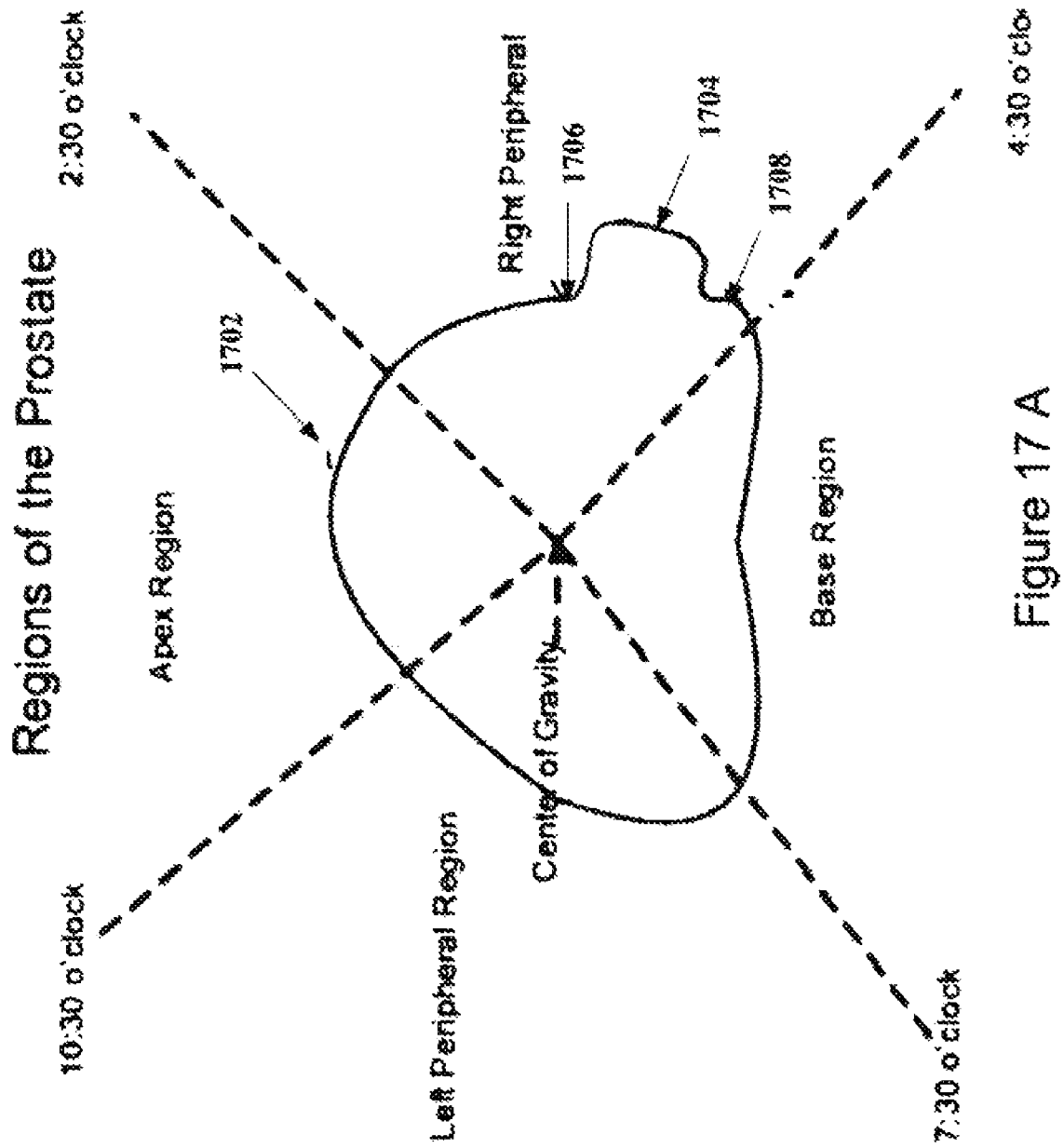
FIGS. 17a and 17b illustrate hump removal from different regions of the prostate.
Figure 17:
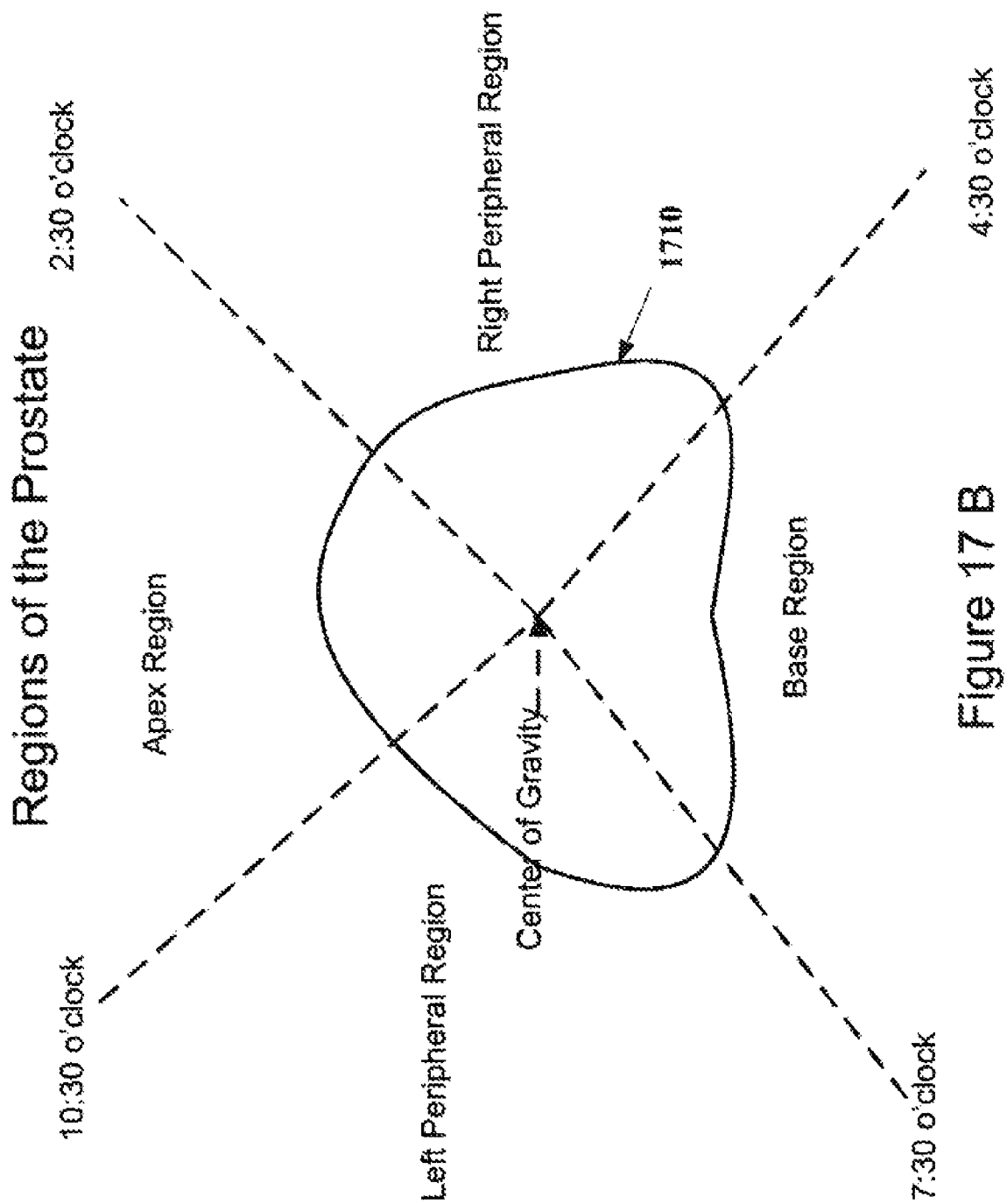

FIG. 17a illustrates an intermediate boundary 1702 of a prostate. As shown, the prostate is divided into four regions for bump correction. Specifically, the prostate is divided into left and right peripheral regions, as well as an apex region (i.e., top region) and a base region (i.e., bottom region). These regions are defined relative to a center point of the image. As shown in FIG. 17a, the right peripheral region includes a bump 1704, which may be caused due to, for example, selection of incorrect maxima point during boundary determination due to speckling, shadows or artificial effects. In any ease, it is desirable that the bump 1704 be removed from the prostate boundary 1702. Accordingly, a process is applied to each section in order to determine irregularities. In this regard, if a curvature on a predetermined portion of the curve within one of the regions exceeds the threshold, the beginning of a bump is identified. Likewise, the end of the bump may also be detected by determining a rate of curvature. Accordingly, by identifying the beginning 1706 and end 1708 of a bump 1704, that portion of the curve may be replaced by a smoothed curve. See, for example, 1710 in FIG. 17b.

Figure 18:
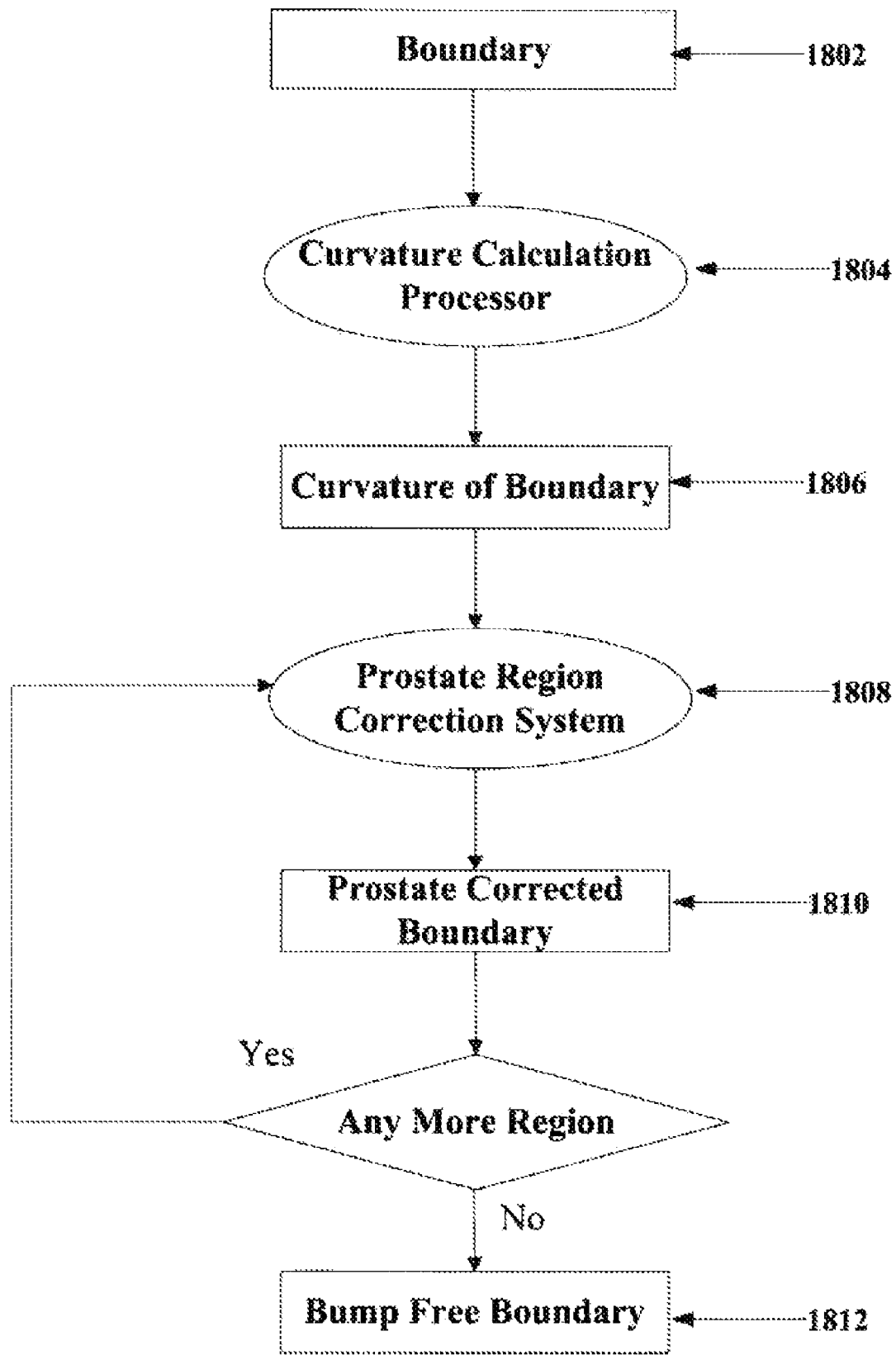
FIG. 18 illustrates a process for removing bumps from regions of the prostate based on curvature.

This process is illustrated in FIG. 18. As shown, the bump processor initially receives the boundary 1802. This boundary 1802 is provided to a curvature calculation processor 1804, which generates information related to the curvature of the boundary 1806. This curvature information is provided to the prostate region correction system. This prostate region correction system is operative to apply different criteria to the different prostate regions based on a priori knowledge regarding each of the prostate regions. In any case, the prostate the region correction system 1808 generally identifies curvature within the current region and determines if the curvature is irregular. If so, the determination is made as to whether the curvature is larger than a predetermine threshold. If so, a bump end position is determined. Accordingly, for first and second such end positions, a splined fitting system may be utilized to generate a smooth boundary between the end positions 1810. Accordingly, this smooth boundary may replace the bump region within the prostate region. Accordingly, this process may be repeated for each region in order to generate a bump free boundary 1812. Once the bump free boundary is generated, it is provided to the smoothing processor 1608. See. FIG. 16.

Figure 19:
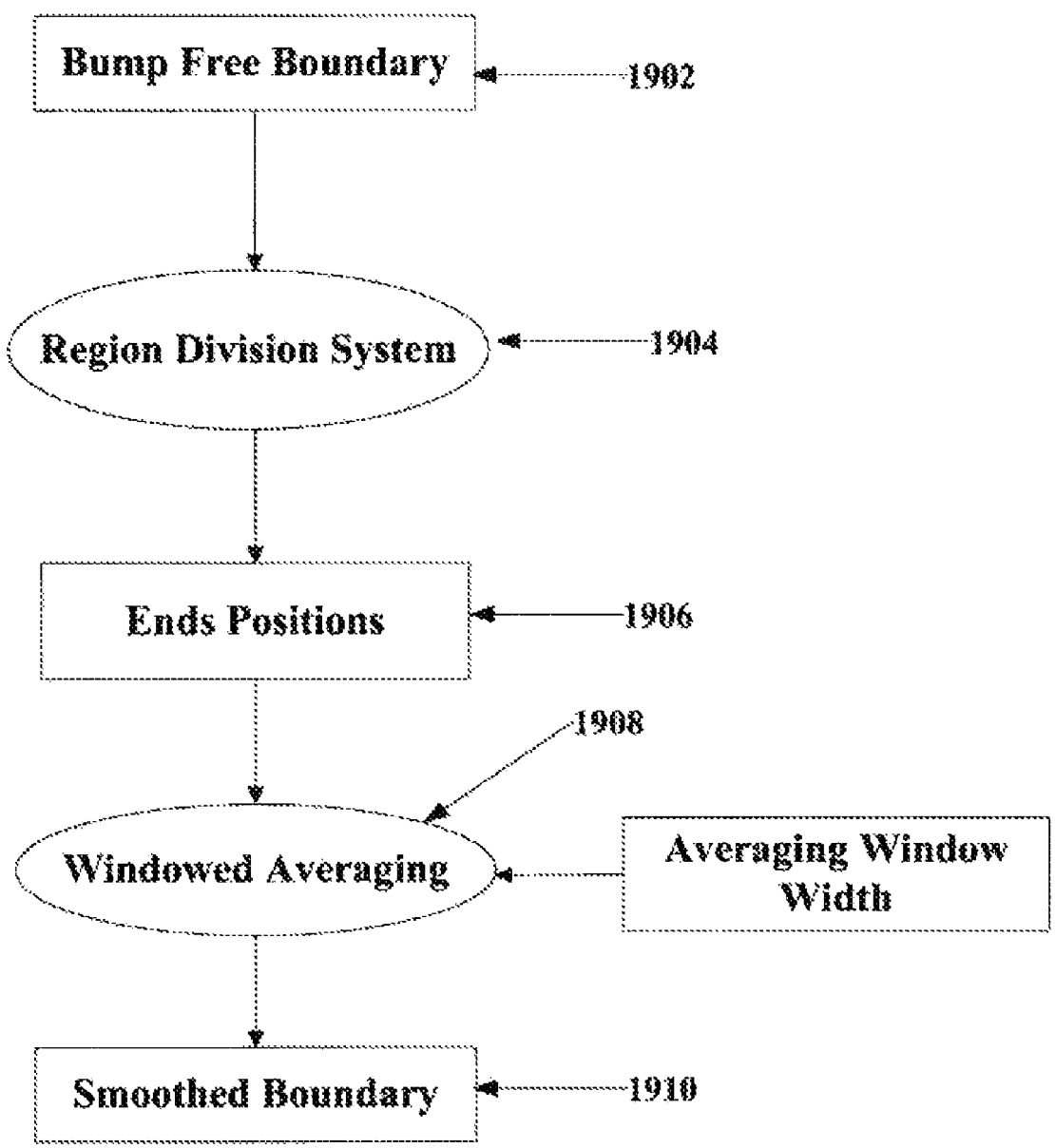
FIG. 19 illustrates a smoothing processor.

The smoothing processor is illustrated in FIG. 19. As shown, the bump free boundary 1902 is provided to a region division system 1904. The region division system 1904 identifies end positions 1906 for each region. For each region, the windowed averaging process 1908 is provided. This process allows input regarding the average window width for each region. In any case, the windowed averaging process 1908 generates a smooth boundary 1910 for each region. Collectively, the smoothed regions generate a smoothed boundary.

Figure 20:
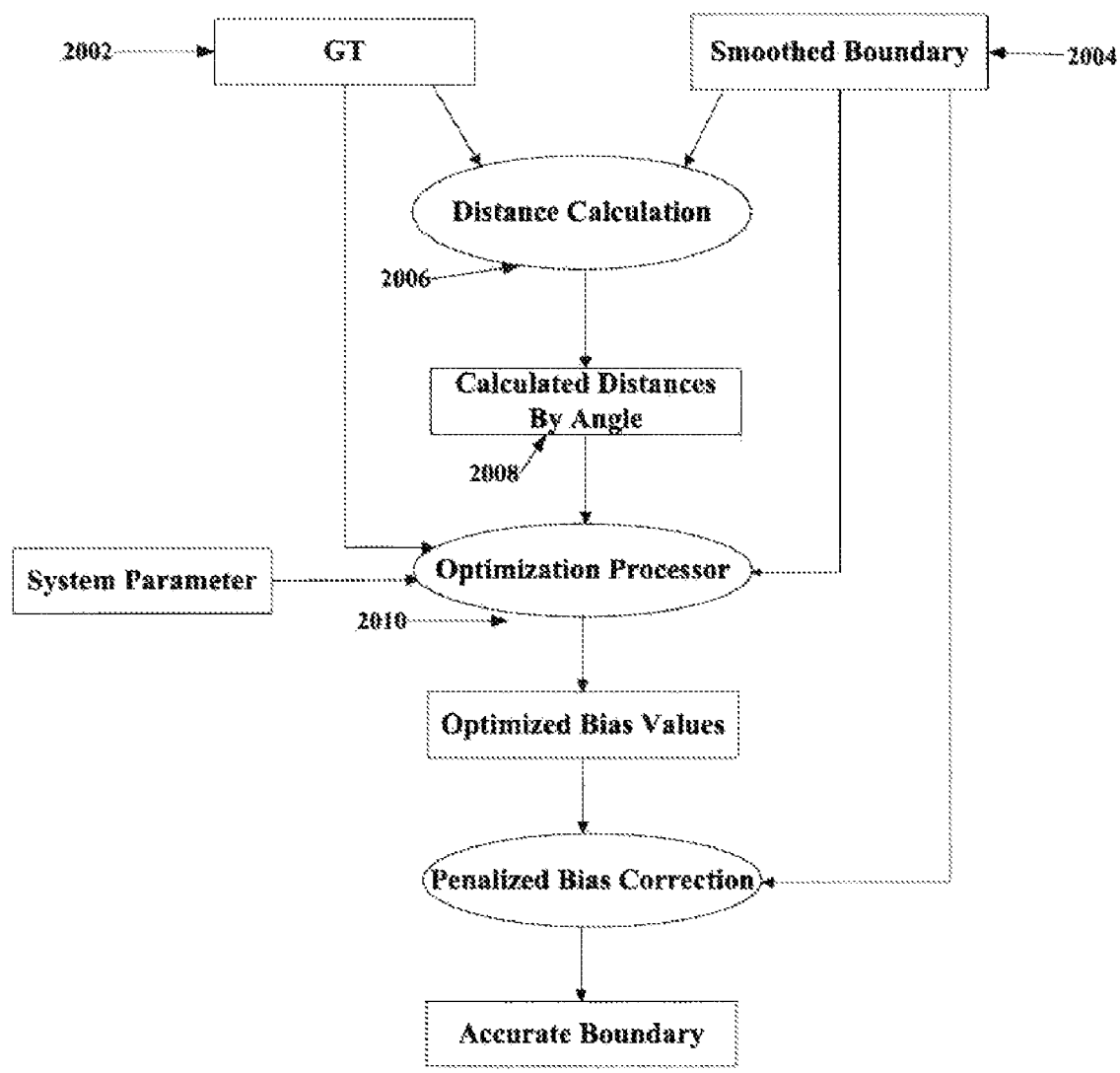
FIG. 20 illustrates utilizing a prior shape model to provide bias correction for an identified boundary.

Referring again to FIG. 16, the smooth boundary 1610 is provided to the bias correction processor 1612. The bias correction processor is illustrated in FIG. 20. The bias correction processor utilizes either a shape model or ground truth 2002 in conjunction with the smooth boundary 2004. This shape model may be the same model that was utilized earlier in setting the initial narrow band region. Initially, a distance calculation between the shape model/ground truth and smoothed boundary is performed 2006. This identifies error between the ground truth and the smoothed boundary. The distance calculation processor 2006 generates calculated distances by angle for the prostate regions. These distances 2008 are provided to an optimization processor in conjunction with the ground truth model 2002 and smoothed boundary 2004. The optimization processor 2010 utilizes this information to provide optimized bias values. That is, a calculation minimizes the error between the computer estimated contour and the ground truth, and an optimized bias value for each region is calculated. The motivation for this process is that, statistically, every computer estimated boundary may fall short in certain region (apex, base, left and right peripheral regions), this is referred to as a system bias. These optimized bias values 2012 are provided to a penalized bias correction processor that adds the bias value to each region respectively. The output of the penalized bias correction processor is an accurate boundary as applied to the down-sampled image. See FIG. 4. Once the boundary is provided on the down-sampled image 412, see 30 of FIG. 3D, the down-sampled and the boundary 30 thereon are provided to a space scale processor 414. The space scale processor 414 is operative to expand the down-sampled image and/or the boundary thereon. Once expanded, the boundary is resized to the size of the initial image. Accordingly, this final, boundary 416 may be applied to the original image. As will be appreciated, the entire process may be repeated on a slice-by-slice basis for a three-dimensional volumetric image. Accordingly, an accurate boundary for the entire three-dimensional image may be generated. Furthermore, accurate volumetric calculation of the prostate image may be performed. Furthermore, such highly accurate images may be utilized to guide instrumentation to locations within the prostate itself.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. An automated method for use in obtaining a boundary of a structure within a medical image, comprising:
   obtaining a 2-D image including a structure of interest;
   identifying a center point of said structure wherein identifying said center point of said structure comprises:
     extending a plurality of parallel lines through said 2-D image;
     calculating an energy value along each said parallel line;
     based on said energy values, identifying approximate edges of said structure in said parallel lines that pass through said structure;
   extending a plurality of radial lines from said center point;
   identifying energy values along each said radial line;
   based on said energy values, identifying a boundary of said structure of interest.

2. The method of claim 1, further comprising, identifying a edge point associated with said structure in each radial line and connecting said edge points with a curve to define a first boundary.

3. The method of claim 1, wherein, identifying said center point comprises:
   determining midpoints between said approximate edges said parallel lines passing through said structure; and
   using a square wave fitting algorithm.

4. The method of claim 1, wherein, identifying said center point comprises:
   determining midpoints between said approximate edges said parallel lines passing through said structure; and
   using a weighted average of said midpoints to generate said center point for said structure within said 2-D image.

5. The method of claim 4, further comprising:
   identifying center points for a plurality of 2-D image slices of a common 3-D area; and
   using said center points, generating a centroid for said structure in said 3-D area.

6. The method of claim 1, wherein identifying an energy value along each radial line comprises:
   calculating a least squares energy and a gradient energy along each said line.

7. The method of claim 6, further comprising:
   adding said least squares energy and said gradient energy to identify candidate edge points, wherein said candidate edge points are maxima in each radial line.

8. The method of claim 7, further comprising:
   fitting an ellipse to the points defined by the largest maxima in each radial line;
   based on the orientation of said ellipse fitted to said points; fitting a shape model boundary to said image.

9. The method of claim 8, further comprising:
   expanding and contracting said shape model to define a narrow band; and
   for each radial line, plotting the point of the largest maxima in the narrow band.

10. The method of claim 9, further comprising:
refitting the ellipse to the points of the largest maximas in the narrow band;
refitting the shape model to the points and redefining a narrow band; and
for each radial line, plotting the point of the largest maxima in the redefined narrow band, wherein said refitting and plotting steps are repeated until convergence.

11. The method of claim 10, wherein upon convergence
fitting a curve to said maxima in said narrow band, wherein said curve is a closed curve and wherein said curve defines a level set function; and
generating a band region by expanding said curve outward to generate an outer boundary of said band region and contracting said curve inward to generate an inward boundary of said band region.

12. The method of claim 11, further comprising:
initialing the level set function in the narrow band region based values from an inner region inside of said narrow band and an outer region outside of said narrow band; and
minimizing a cost functional defined in the narrow region with the initial level set function.

13. The method of claim 12, further comprising:
obtaining a final boundary form said level set function; and
performing a correction on said final boundary.

14. The method of claim 1, further comprising:
identifying a edge point associated with said structure in each radial line and connecting said edge points with a curve to define a first boundary;
generating a narrow band based on said first boundary; and
initialing the level set function in the narrow band region based values from an inner region inside of said narrow band and an outer region outside of said narrow band.

15. The method of claim 14, further comprising:
minimizing a cost functional defined in the narrow region with the level set function; and
generating said boundary of said structure of interest.

16. The method of claim 1, further comprising:
down-sampling said 2-D image prior to identifying said center point, wherein said boundary is identified on said down-sampled image.

17. The method of claim 16, further comprising:
rescaling said boundary to match the 2-D image size prior to down-sampling; and
applying said boundary to an original version of said 2-D image.

18. The method of claim 1, further comprising:
performing a boundary calibration on said boundary.

19. The method of claim 18, wherein said boundary calibration comprises at least one of:
a bump removal process;
a smoothing process; and
a bias correction process.

20. The method of claim 19, wherein said bump removal process comprises:
identifying start and end points of a bump region in said boundary based on curvature exceeding a predetermined threshold; and
connecting start and end points using a smoothed curve.

21. The method of claim 20, wherein said smoothing process comprises:
detecting end points of a prostate region; and
applying a smoothing function to said region.

22. An automated method for use in obtaining a boundary of a structure within a medical image, comprising:
obtaining a 2-D image including a structure of interest;
identifying a center point of said structure;
extending a plurality of radial lines from said center point;
identifying energy values along each said radial line;
based on said energy values, identifying a boundary of said structure of interest;
performing a boundary calibration on said boundary including a bump removal process, said bump removal process comprising:
identifying start and end points of a bump region in said boundary based on curvature exceeding a predetermined threshold; and
connecting said start and end point using a smoothed curve.

23. An automated method for use in obtaining a boundary of a structure within a medical image, comprising:
obtaining a 2-D image including a structure of interest;
identifying a center point of said structure;
extending a plurality of radial lines from said center point;
identifying energy values along each said radial line by calculating a least squares energy and a gradient energy along each said line and adding said least squares energy and said gradient energy to identify candidate edge points, wherein said candidate edge points are maxima in each line;
fitting an ellipse to the points defined by the largest maxima in each radial line;
based on the orientation of said ellipse fitted to said points, fitting a shape model boundary to said image;
expanding and contracting said shape model to define a narrow band; and
for each radial line, plotting the point of the largest maxima in the narrow band; and
fitting a curve to said maxima in said narrow band to define a boundary of said structure of interest.

24. The method of claim 23, wherein said curve is a closed curve and wherein said closed curve defines a level set function; and
initialing the level set function in the narrow band region based values from an inner region inside of said narrow band and an outer region outside of said narrow band; and
minimizing a cost functional defined in the narrow band with the initial level set function.

25. An automated method for use in obtaining a boundary of a structure within a medical image, comprising:
obtaining a 2-D image including a structure of interest;
identifying a center point of said structure;
extending a plurality of radial lines from said center point;
identifying energy values along each said radial line;
based on said energy values, generating a boundary of said structure of interest, wherein generating said boundary comprises.
identifying a edge point associated with said structure in each radial line and connecting said edge points with a curve to define a first boundary;
generating a narrow band based on said first boundary;
initialing the level set function in the narrow band based values from an inner region inside of said narrow band and an outer region outside of said narrow band; and
minimizing a cost functional defined in the narrow region with the level set function.

\* \* \* \* \*

UNITED STATES PATENT AND TRADEMARK OFFICE
CERTIFICATE OF CORRECTION

| | | |
|---|---|---|
| PATENT NO. | : 7,856,130 B2 | |
| APPLICATION NO. | : 11/833404 | |
| DATED | : December 21, 2010 | |
| INVENTOR(S) | : Suri et al. | |

It is certified that error appears in the above-identified patent and that said Letters Patent is hereby corrected as shown below:

Column 12, line 12, delete "ah" and insert therefor --an--.
Column 12, line 50, delete "ease" and insert therefor --case--.

Signed and Sealed this
Thirty-first Day of May, 2011

David J. Kappos
*Director of the United States Patent and Trademark Office*